(12) United States Patent
Ohishi

(10) Patent No.: US 7,123,290 B2
(45) Date of Patent: Oct. 17, 2006

(54) BLUR CORRECTION OPTICAL DEVICE AND LENS BARREL

(75) Inventor: Sueyuki Ohishi, Shinagawa-ku (JP)

(73) Assignee: Nikon Corporation, Tokyo (JP)

( * ) Notice: Subject to any disclaimer, the term of this patent is extended or adjusted under 35 U.S.C. 154(b) by 785 days.

(21) Appl. No.: 10/367,852

(22) Filed: Feb. 19, 2003

(65) Prior Publication Data

US 2004/0017485 A1 Jan. 29, 2004

(30) Foreign Application Priority Data

Feb. 19, 2002 (JP) ............................. 2002-041279

(51) Int. Cl.
*H04N 5/228* (2006.01)
*G03B 17/00* (2006.01)

(52) U.S. Cl. ....................... 348/208.4; 396/52; 396/55

(58) Field of Classification Search .......... 348/208.99, 348/208.1, 208.2, 208.3, 208.4; 359/819, 359/554–557; 396/52, 55
See application file for complete search history.

(56) References Cited

U.S. PATENT DOCUMENTS

| | | | |
|---|---|---|---|
| 5,410,352 A | | 4/1995 | Watanabe |
| 6,046,768 A | * | 4/2000 | Kaneda et al. ........... 348/208.2 |
| 6,047,133 A | * | 4/2000 | Washisu et al. ................ 396/55 |
| 6,091,448 A | * | 7/2000 | Washisu et al. ........ 348/208.16 |
| 6,122,448 A | * | 9/2000 | Shiomi ........................ 396/55 |
| 6,718,131 B1 | * | 4/2004 | Okazaki et al. ................ 396/55 |
| 6,735,383 B1 | * | 5/2004 | Imada ........................ 396/55 |
| 2005/0046975 A1 | * | 3/2005 | Katagishi et al. ........... 359/819 |

FOREIGN PATENT DOCUMENTS

JP B2 8-32037 3/1996
JP B2 7-59069 6/1996

* cited by examiner

*Primary Examiner*—David Ometz
*Assistant Examiner*—Kelly Jerabek
(74) *Attorney, Agent, or Firm*—Oliff & Berridge PLC

(57) ABSTRACT

A blur correction device comprises a blur correction optical system that corrects an image blur caused by a vibration; a drive device that drives the blur correction optical system; a locking device that locks the blur correction optical system when an image blur correction is not executed; a gravitational direction detection device that detects a direction of a gravitational force applied to the blur correction optical system; and a control device that controls drive of the drive device and the locking device. After stopping an operation executed by the drive device to correct the image blur, the control device controls the drive device so as to reduce an extent to which the blur correction optical system having been locked by the locking device is allowed to move along the gravitational direction.

16 Claims, 14 Drawing Sheets

FIG. 9A
(TIME POINT t13)
FIG. 9B
(TIME POINT t14)
FIG. 9C
(TIME POINT t16)
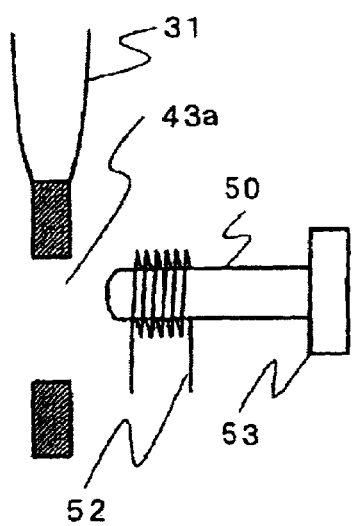
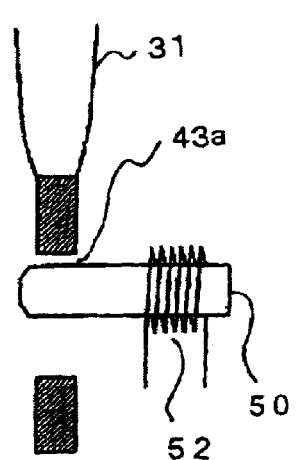
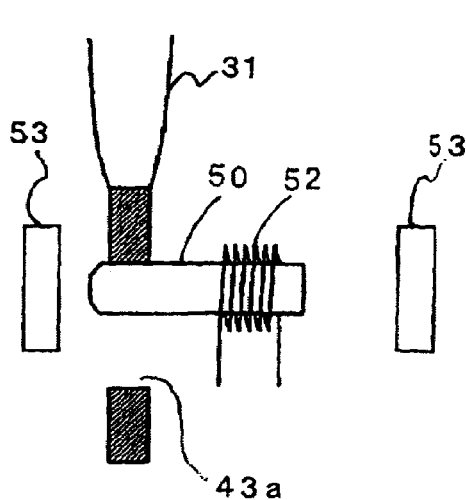

(TIME POINT t23)

(TIME POINT t24)

(TIME POINT t26)

(TIME POINT t27)

BLUR CORRECTION OPTICAL DEVICE AND LENS BARREL

INCORPORATION BY REFERENCE

The disclosure of the following priority application is herein incorporated by reference: Japanese Patent Application No. 2002-041279 filed Feb. 19, 2002.

BACKGROUND OF THE INVENTION

1. Field of the Invention

The present invention relates to a blur correction device that prevents image blur in a camera, binoculars or the like and a lens barrel, and more specifically, it relates to a technology that may be adopted to lock a blur correction optical system.

2. Description of the Related Art

There is a blur correction device known in the related art that corrects image blur occurring at an image capturing surface, at a film surface or inside a viewfinder by employing a blur correction optical system. This device detects an angular speed of an image capturing device or the like attributable to hand movement as a vibration quantity. Then, it corrects the image blur by driving the blur correction optical system along two directions each extending substantially perpendicular to a photographic optical axis in correspondence to the detected vibration quantity. A correction lens in the blur correction optical system is locked at a predetermined position by a locking mechanism when no blur correction is executed, so as not to affect the optical performance of the photographic lens and the like.

However, even when the correction lens is locked by the locking mechanism, the correction lens is caused to move along the gravitational direction by its own weight due to play in the locking mechanism. At this time, the subject image in the viewfinder or the like moves, causing a visual distraction for the user.

SUMMARY OF THE INVENTION

The present invention is to provide a blur correction optical device that prevents a subject image from vibrating when a blur correction optical system is locked, and a lens barrel comprising the blur correction optical device.

A blur correction device according to the present invention comprises a blur correction optical system that corrects an image blur caused by a vibration; a drive device that drives the blur correction optical system; a locking device that locks the blur correction optical system when an image blur correction is not executed; a gravitational direction detection device that detects a direction of a gravitational force applied to the blur correction optical system; and a control device that controls drive of the drive device and the locking device. After stopping an operation executed by the drive device to correct the image blur, the control device controls the drive device so as to reduce an extent to which the blur correction optical system having been locked by the locking device is allowed to move along the gravitational direction.

It is preferable that the control device controls the drive device and the locking device so that the blur correction optical system is caused to move to a position away from a central position of a movement range of the blur correction optical system by a predetermined distance along the gravitational direction detected by the gravitational direction detection device and then the blur correction optical system is locked. The movement range is a range over which the blur correction optical system having been locked by the locking device is allowed to move due to play present between the blur correction optical system and the locking device. A rewritable, nonvolatile storage device may be provided and the control device causes the blur correction optical system to move by the predetermined distance stored in the nonvolatile storage device.

It is also acceptable that the control device controls the drive device and the locking device so that the blur correction optical system having been locked by the locking device is made to move to a substantial end of a movement range of the blur correction optical system along the gravitational direction detected by the gravitational direction detection device and then the blur correction optical system is locked. The movement range is a range over which the blur correction optical system is allowed to move due to play present between the blur correction optical system and the locking device.

It is possible that the control device selects one locking position among a plurality of locking positions set within a movement range of the blur correction optical system in conformance to the gravitational direction detected by the gravitational direction detection device and controls the drive device and the locking device so that the blur correction optical system is caused to move to the locking position having been selected and then the blur correction optical system is locked. The movement range is a range over which the blur correction optical system having been locked by the locking device is allowed to move due to play present between the blur correction optical system and the locking device. A rewritable, nonvolatile storage device may be provided and the control device may select one of the plurality of locking positions stored in memory at the nonvolatile storage device.

It is acceptable that the control device controls the drive device so that after locking the blur correction optical system with the locking device, the blur correction optical system is made to move along the gravitational direction detected by an the gravitational direction detection device within a movement range over which the blur correction optical system having been locked by the locking device is allowed to move due to play present between the blur correction optical system and the locking device. It is preferable that the control device controls the drive device so that after locking the blur correction optical system with the locking device, the blur correction optical system is caused to move away from a central position of the movement range by a predetermined extent along the gravitational direction. A rewritable, nonvolatile storage device may be provided and the control device may cause the blur correction optical system to move by the predetermined extent stored in the nonvolatile storage device.

It is preferable that the control device causes the blur correction optical system to move along the gravitational direction at a predetermined speed after locking the blur correction optical system with the locking device. A rewritable, nonvolatile storage device may be provided and the control device may cause the blur correction optical system to move at the predetermined speed stored in the nonvolatile storage device.

The gravitational direction detection device may detect the gravitational direction based upon a drive quantity over which the blur correction optical system is driven by the drive device. It is preferable that the drive device drives the blur correction optical system at least along two directions extending substantially perpendicular to each other; and the gravitational direction detection device detects the gravitational direction based upon drive quantities over which the blur correction optical system is driven along the two directions by the drive device.

The gravitational direction detection device may calculate a moving average of a drive quantity over which the blur correction optical system is driven by the drive device and detects the gravitational direction based upon the moving average having been calculated. It is possible for the gravitational direction detection device to execute low pass filter processing on a drive quantity over which the blur correction optical system is driven by the drive device and detects the gravitational direction based upon low pass filter processing results.

A lens barrel according to the present invention comprises a blur correction device according to claim 1.

BRIEF DESCRIPTION OF THE DRAWINGS

FIGS. 9A~9C schematically show the positional relationship among the correction lens, a locking hole and a locking pin achieved during the electromagnetic locking operation;

DESCRIPTION OF THE PREFERRED EMBODIMENTS

Figure 13:
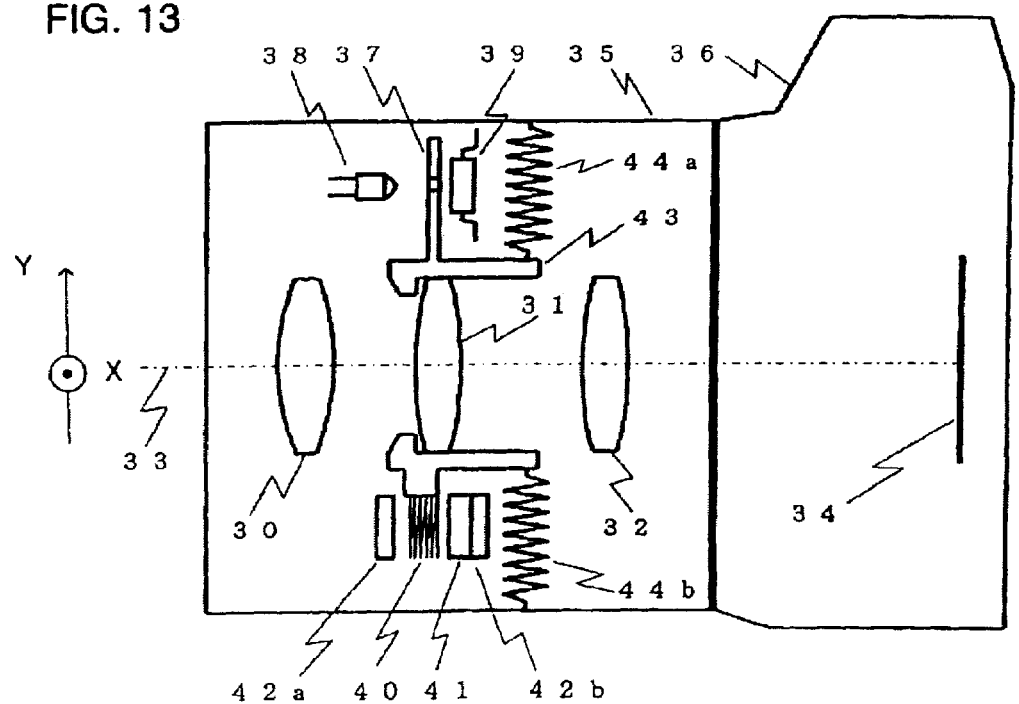
FIG. 13 is a block diagram schematically illustrating the structure adopted in a blur correction optical system in a camera system having a locking device achieved in an embodiment of the present invention.

The following is a detailed explanation of an embodiment of the present invention, given in reference to drawings. FIG. 13 schematically illustrates the internal structure of a camera system having a locking device that locks a blur correction optical system achieved in the embodiment. The camera system shown in FIG. 13 includes a lens barrel at which a blur correction device is provided, i.e., an interchangeable lens 35, and a camera body 36. The interchangeable lens 35 is detachably mounted at the camera body 36 via a bayonet mount or the like (not shown).

It is to be noted that two directions extending substantially perpendicular to a photographic optical axis 33 and intersecting each other at a substantially right angle are referred to as an X-axis direction and a Y-axis direction. In FIG. 13, the X-axis direction extends perpendicular to the drawing sheet on which FIG. 13 is presented, i.e., the X axis extends along the horizontal direction when the camera is held laterally. The Y axis extends from bottom to top of the drawing sheet, more specifically, the direction along which gravity works when the camera is held laterally is the −Y-axis direction. FIG. 13 only shows the structure along the Y-axis direction to simplify the illustration, and the power supply, the electrical circuits and the like are not shown in FIG. 13.

First, the blur correction device in the camera system shown in FIG. 13 is described.

As shown in FIG. 13, the interchangeable lens 35 includes photographic lenses 30 and 32 and a correction lens 31. The correction lens 31, which constitutes a so-called blur correction optical system, is elastically held at a lens barrel member of the interchangeable lens 35 by a moving member 43 and springs 44a and 44b. The correction lens 31 is held gently enough so that the drive control of the correction lens 31 is not affected. In addition, the correction lens 31 supported by the moving member 43 is caused to move by a drive mechanism to be detailed later along the X axis and the Y axis extending substantially perpendicular to the photographic optical axis 33 and intersecting each other at a substantially right angle. In other words, the correction lens 31 is allowed to move freely within a predetermined movement range on a plane (the X-Y plane) which is substantially perpendicular to the optical axis 33.

Figure 14A:
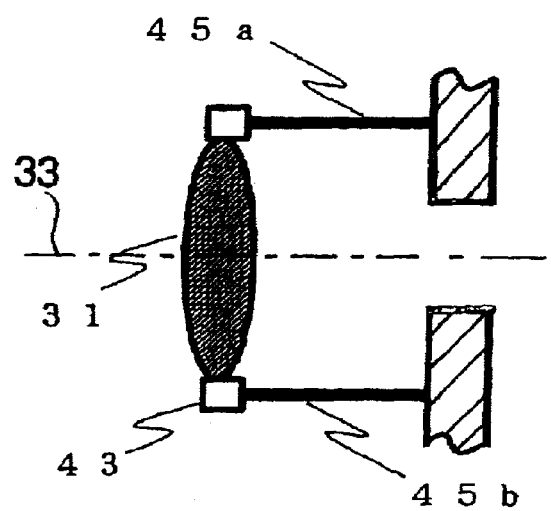
FIGS. 14A and 14B schematically show another example of a correction lens moving mechanism.
Figure 14B:
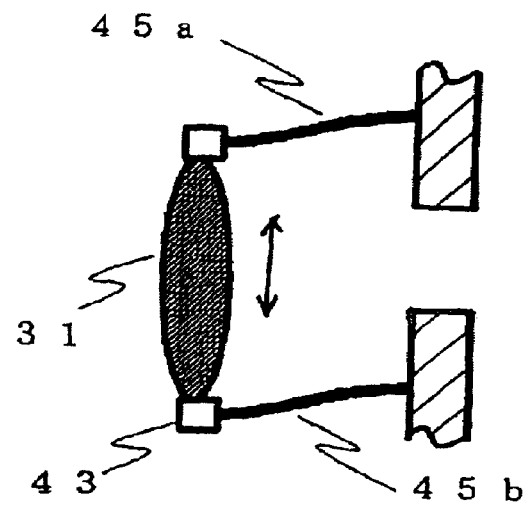

FIGS. 14A and 14B show another example of a mechanism that may be used to support the correction lens 31. The correction lens 31 can be supported at part of a lens barrel member of the interchangeable lens 35 in a cantilever system with supporting rods 45a, 45b, 45c and 45d (45c and 45d not shown) that are capable of elastic flexure, as shown in FIG. 14A. In this manner, as the moving member 43 is driven to cause flexure of the supporting rods 45a, 45b, 45c and 45d, the correction lens 31 is allowed to move along a direction extending substantially perpendicular to the optical axis 33, as shown in FIG. 14B.

A vibration occurring at the camera system due to hand movement or the like is detected as a camera vibration quantity by an angular speed sensor or the like (not shown). The camera system corrects an image blur manifesting at a film surface 34, inside a viewfinder or the like by moving the correction lens 31 along the X axis and/or the Y axis in correspondence to the detected vibration quantity.

The following is an explanation of the drive mechanism that moves the correction lens 31 within the plane (X-Y plane) that is substantially perpendicular to the optical axis 33. As shown in FIG. 13, a coil 40 is attached to the moving member 43 shown toward the bottom of the drawing. In addition, a magnet 41 having two poles and yokes 42a and 42b are provided at part of the lens barrel member of the interchangeable lens 35 via a supporting member (not shown). The yokes 42a and 42b are constituted of a material achieving a high degree of magnetic permeability such as iron. The magnet 41 and the yokes 42a and 42b, which are disposed so as to enclose the coil 40, constitute a moving coil actuator, i.e., a so-called electromagnetic actuator.

As an electric current is supplied to the coil 40, an electromagnetic force is generated, causing the moving member 43 and the correction lens 31 to move along a direction (the X-axis direction or the Y-axis direction) extending substantially perpendicular to the optical axis 33. However, the correction lens 31 is allowed to move within a specific limited movement range. The interchangeable lens 35 includes drive mechanisms that move the correction lens 31 along the X axis and the Y axis, and the correction lens 31 is able to move along the two directions extending substantially perpendicular to the optical axis 33 by these drive mechanisms. It is to be noted that a correction lens drive circuit 12 (see FIG. 1) to be detailed later implements drive control of the drive mechanisms for the correction lens 31.

Figure 15:
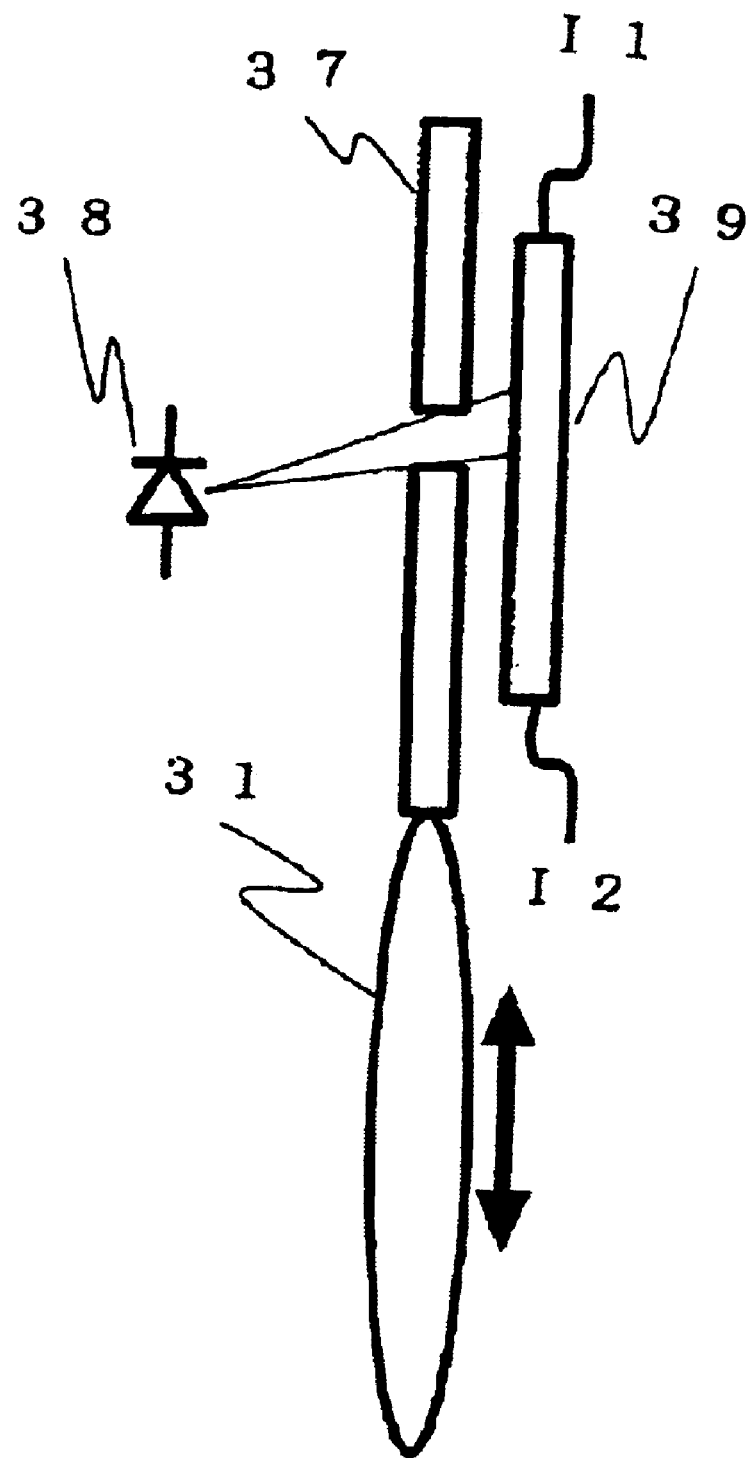
FIG. 15 schematically illustrates a correction lens position detection mechanism achieved in an embodiment.

A position detection mechanism employed to detect the position of the correction lens 31 is explained next. In this example, the position of the correction lens 31 is detected through the standard optical position detection method. FIG. 15 shows a schematic sectional view of the position detection mechanism. It is to be noted that FIG. 15 does not show the moving member 43 so as to simplify the illustration.

As shown in FIGS. 13 and 15, a slit member 37 is mounted at the moving member 43 located toward the top of the drawing. In addition, a light emitting diode LED 38 and a one-dimensional PSD (position sensitive device) constituting an optical position detection element are provided at part of the lens barrel member of the interchangeable lens 35 via a supporting member (not shown). The LED 38 and the PSD 39, which are away from each other along the optical axis 33, are set so as to enclose the slit member 37 on two sides.

The PSD 39 generates a photocurrent, the level of which is in proportion to the total quantity of light having entered the PSD. The PSD 39 outputs photocurrents I1 and I2 through two output terminals. The ratio of the photocurrent I1 output through one of the output terminals of the PSD 39 and the photocurrent I2 output through the other output terminal changes in conformance to the position of the light (the center of gravity of the total light) entering the PSD 39 through the slit member 37. Namely, the position of the center of gravity of the light entering the PSD 39 can be detected based upon the ratio of the two photocurrents I1 and I2 output from the PSD 39.

As shown in FIG. 15, light generated by the LED 38 travels through a slit at the slit member 37 and enters the PSD 39. The PSD 39 outputs the photocurrents I1 and I2 to correction lens position detection circuit 11 (see FIG. 1) to be detailed later in order to detect the center of gravity of the light having entered the PSD 39. Since the position of the slit member 37 changes as the correction lens 31 moves, the position of the correction lens 31 can be detected by detecting the center of gravity of the light entering the PSD 39 through the slit member 37.

The position detection mechanism that detects the position of the correction lens 31 along either the X axis or the Y axis alone is shown in FIGS. 13 and 15. However, the interchangeable lens 35 includes position detection mechanisms that detect the position of the correction lens 31 along two directions, i.e., along the X axis and along the Y axis. Output signals I1 and I2 from the position detection mechanisms are output to the correction lens position detection circuit 11 to enable detection of the position of the correction lens 31 along the X axis and the Y axis.

As explained above, the correction lens 31 is driven to move within the X-Y plane by the correction lens drive mechanisms for a blur correction. When a blur correction is not executed, on the other hand, the correction lens 31 is held lightly at the lens barrel member of the interchangeable lens 35 elastically by the springs 44a and 44b. In other words, when no power is supplied to the coil 40 to implement drive control on the correction lens 31, the weight of the correction lens 31, the moving members 43 and the like causes the correction lens 31 to move downward, i.e., to become offset along the gravitational direction.

The optical performance of the interchangeable lens 35 can be maximized when the correction lens 31 is positioned almost at the center of its movement range, i.e., when the correction lens 31 is positioned on the optical axis 33. Accordingly, it is desirable to lock the correction lens 31 at an approximate center of the movement range when a blur correction is not executed. The following is an explanation of the locking mechanism employed to lock the correction lens 31 at an approximate center of its movement range. In this example, a so-called electromagnetic locking mechanism is employed to electromagnetically lock the correction lens 31 at a fixed position.

Figures 16A, 16B:
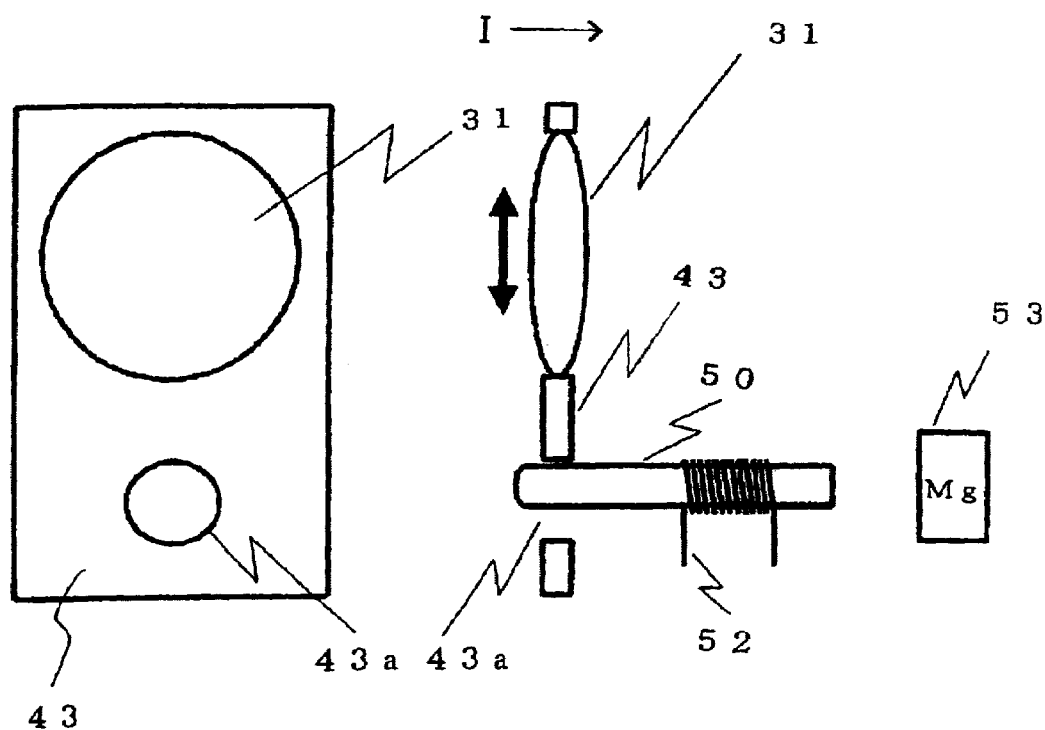
FIGS. 16A and 16B schematically illustrate the electromagnetic locking mechanism utilized to lock the correction lens in an embodiment.

FIGS. 16A and 16B schematically illustrate electromagnetic locking mechanism. FIG. 16B schematically illustrates the overall structure of the electromagnetic locking mechanism. FIG. 16A shows the moving member 43 in FIG. 16B viewed from the direction indicated by the arrow I.

As shown in the FIGS. 16A and 16B, the electromagnetic locking mechanism comprises a locking pin 50, an electromagnetic locking coil 52, a holding plate 53 and a locking hole 43a. The locking pin 50, the electromagnetic locking coil 52 and the holding plate 53 are disposed at part of the lens barrel member of the interchangeable lens 35. The round locking hole 43a is formed at the moving member 43 supporting the correction lens 31 as shown in FIG. 16A. When no blur correction is executed, the locking pin 50 is inserted at the locking hole 43a so as to lock the moving member 43 and the correction lens 31 at secure positions.

In more specific terms, the electromagnetic locking coil 52 is coiled around the locking pin 50 constituted of a material achieving a high degree of magnetic permeability such as iron. The magnetized holding plate 53 such as a magnet is provided near one end of the locking pin 50, and the locking hole 43a at the moving member 43 is positioned near the other end of the locking pin 50.

As power is supplied to the electromagnetic locking coil 52 along a specific direction while the locking pin 50 is magnetically held at the holding plate, the electromagnetic force causes the locking pin 50 to depart the holding plate 53 and move into the locking hole 43a, as shown in FIG. 16B. The state in which the locking pin 50 is inserted at the locking hole 43a and the correction lens 31 is electromagnetically locked at an approximate center of its movement range as described above is referred to as an electromagnetically locked state. If power is supplied to the electromagnetic locking coil 52 along the reverse direction in the electromagnetically locked state, the electromagnetic force generated at the locking pin 50 causes the locking pin 50 to move out of the locking hole 43a and become attached to the holding plate 53. The state in which the moving member 43 and the correction lens 31 are allowed to move is referred to as an electromagnetic lock released state. It is to be noted that the correction lens 31 is set in the electromagnetically locked state when the blur correction is not executed, whereas it is set in the electromagnetic lock released state when the blur correction is executed.

If the locking pin 50 is inserted with no play at the locking hole 43a in the electromagnetically locked state, the correction lens 31 is not allowed to become displaced along the gravitational direction. However, a gap does exist between the locking hole 43a and the locking pin 50 for the following reasons, and thus, the correction lens 31 is allowed to move to the degree allowed by the gap (hereafter referred to as electromagnetic locking play) even in the electromagnetically locked state.

A first reason that the electromagnetic locking play is bound to exist is an error occurring in the control of the correction lens 31. The locking pin 50 needs to be inserted at the locking hole 43a with a high degree of reliability in order to electromagnetically lock the correction lens 31. Accordingly, the correction lens 31 is first driven so as to move to an approximate center of its movement range (hereafter referred to as an electromagnetic locking center position) and then the correction lens 31 is electromagnetically locked by supplying power to the electromagnetic locking coil 52. In other words, the correction lens 31 is made to move to and is then electromagnetically locked at a position at which the locking pin 50 is inserted at the center of the locking hole 43a so that the gap between the locking hole 43a and the locking pin 50 ranges with substantial uniformity along both the vertical direction and the horizontal direction.

However, a control error occurs under normal circumstances in the drive control of the correction lens 31. An external disturbance such as a vibration of the camera, in particular, induces a control error at the correction lens 31. Even in the event of such a control error, the correction lens 31 must be electromagnetically locked with reliability when it is no longer necessary to perform the blur correction. In other words, the electromagnetic locking play is normally designed to be large enough to ensure that the locking pin 50 can be inserted at the locking hole 43a with reliability when electromagnetically locking the correction lens 31.

A second reason that is bound to be electromagnetic locking play is the dimensional inconsistency in the parts constituting the electromagnetic locking mechanism among individual products. For instance, the diameters of locking holes 43a and the diameters of the locking pins 50 in individual products are bound to deviate from the design values. In addition, ideally, the locking pin 50 should be inserted at the locking hole 43a so as to extend perpendicular to the moving member 43. However, considering inconsistency that is bound to occur when mass producing parts, the locking pin 50 may sometimes be inserted somewhat diagonally relative to the moving member 43. For this reason, the locking hole 43a needs to have a diameter with a sufficient margin relative to the diameter of the locking pin 50 to ensure that the locking pin 50 is reliably inserted at the locking hole 43a and, as a result, electromagnetic locking play occurs.

When there is electromagnetic locking play, the correction lens 31 is caused to move downward along the gravitational direction by its own weight immediately after the correction lens 31 becomes electromagnetically locked upon completing the blur correction operation. Namely, after driving the correction lens 31 to the electromagnetic locking center position at an approximate center of its movement range, inserting the locking pin 50 at the locking hole 43a and thus achieving an electromagnetic lock, the correction lens 31 becomes displaced by an extent corresponding to the electromagnetic locking play existing between the locking pin 50 and the locking hole 43a. At this time, the optical axis 33 becomes offset in correspondence to the extent to which the correction lens 31 has become displaced, which then causes a shift in the image forming position. As a result, the subject image or the like in the viewfinder or the like vibrates, causing a visual distraction for the user.

Accordingly, locking control is implemented for the correction lens 31 so that no unnatural vibration of the subject image occurs after the blur correction in the embodiment. The following is a detailed explanation of the locking device employed to lock the blur correction optical system in an embodiment of the present invention, given in reference to the drawings.

First, the electrical hardware is explained.

Figure 1:
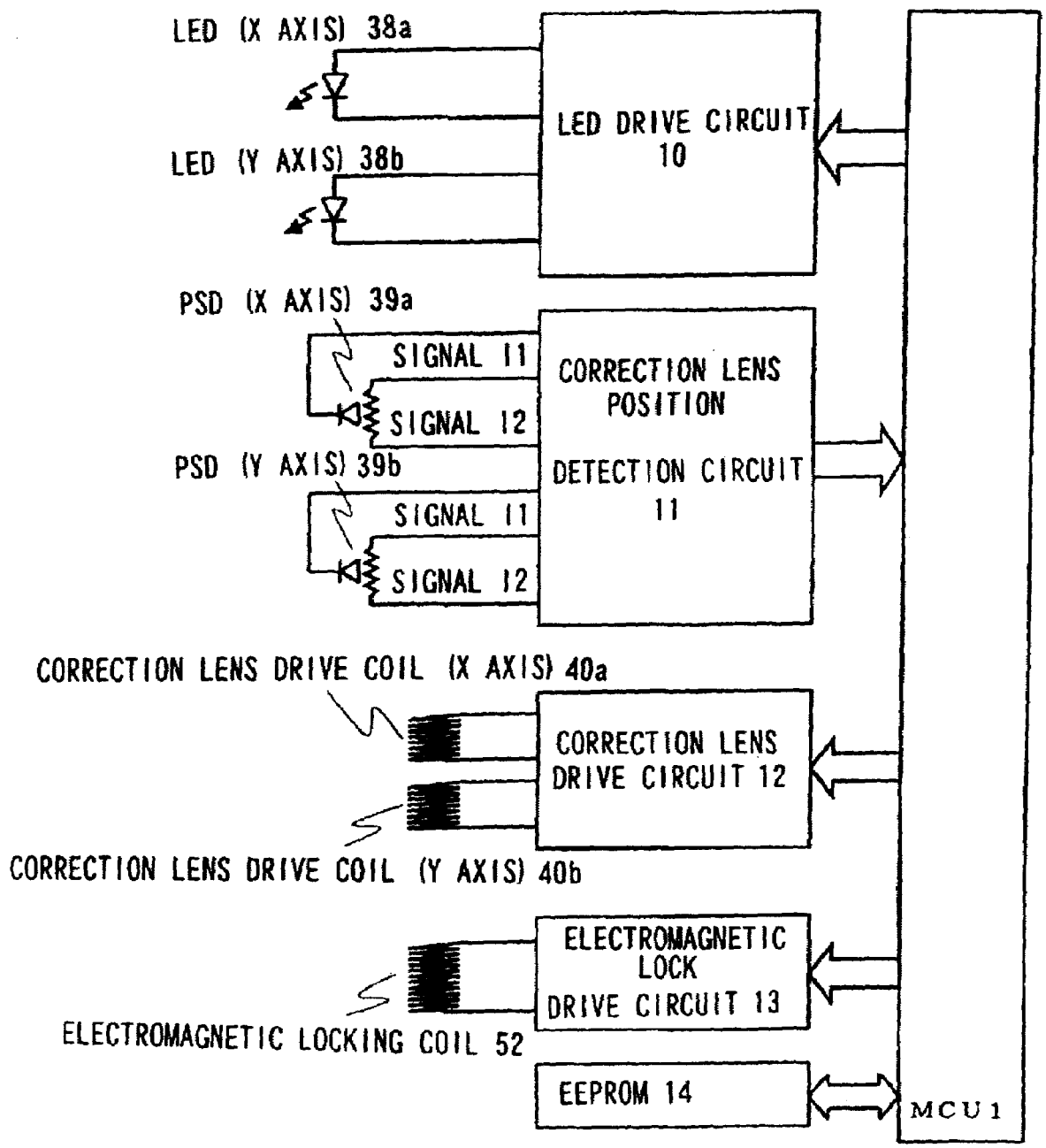
FIG. 1 is an electrical circuit diagram related to an embodiment of the present invention.

FIG. 1 is an electrical circuit block diagram of the locking device employed to lock the blur correction optical system in the embodiment of the present invention. It is to be noted that FIG. 1 does not show an angular speed detection circuit that detects the angular speed of the camera system, a power supply that generates power for operating circuits and elements and other electrical circuits. The electrical hardware shown in FIG. 1 is provided at the interchangeable lens 35.

As shown in FIG. 1, a one-chip microcomputer MCU 1 is connected with an LED drive circuit 10, the correction lens position detection circuit 11, the correction lens drive circuit 12, an electromagnetic lock drive circuit 13 and an EEPROM 14. The MCU 1 is a control unit that controls the blur correction operation and the electromagnetic locking operation. The MCU 1 has internal functions as an A/D converter for converting an analog signal provided by the correction lens position detection circuit 11 to a digital signal, a timer and the like.

The EEPROM 14, which is a rewritable, nonvolatile storage medium, allows write and read of various parameters, data and the like whenever necessary.

The LED drive circuit 10, which is controlled by the MCU 1, drives an X-axis LED 38a and a Y-axis LED 38b in order to detect the position of the correction lens 31. Beams of light generated at the LEDs 38a and 38b pass through the slit member 37 and then enter an X-axis PSD 39a and a Y-axis PSD 39b respectively.

The correction lens position detection circuit 11 detects the positions of the centers of gravity of the light beams having entered the PSDs 39a and 39b by processing an I1 signal and an I2 signal respectively output by the PSD 39a and the PSD 39b. In addition, it calculates the position of the correction lens 31 along the X axis and the Y axis (hereafter referred to as a correction lens position LR) based upon the detected positions of the centers of gravity of the light beams. The correction lens position LR thus calculated is output to the MCU 1. The MCU 1 converts the analog output signal from the correction lens position detection circuit 11 to a digital signal with its internal A/D converter and verifies the correction lens position LR along the X axis and the Y axis.

The correction lens drive circuit 12, which is controlled by the MCU 1, implements drive control on the correction lens 31 by driving an X-axis correction lens drive coil 40a and a Y-axis correction lens drive coil 40b. The method adopted to implement the drive control on the correction lens 31 is to be detailed later.

The electromagnetic lock drive circuit 13, which is controlled by the MCU 1, drives the locking pin 50 by controlling the power supply to the electromagnetic locking coil 52.

Next, the method adopted to calculate the drive quantities for the correction lens 31 and detect the direction of gravity relative to the correction lens 31 based upon correction lens drive quantities that have been calculated is explained in detail.

(1) Correction Lens Drive Quantity Calculation

First, the method adopted to calculate a correction lens drive quantity Vcontrol is explained.

Figure 2:
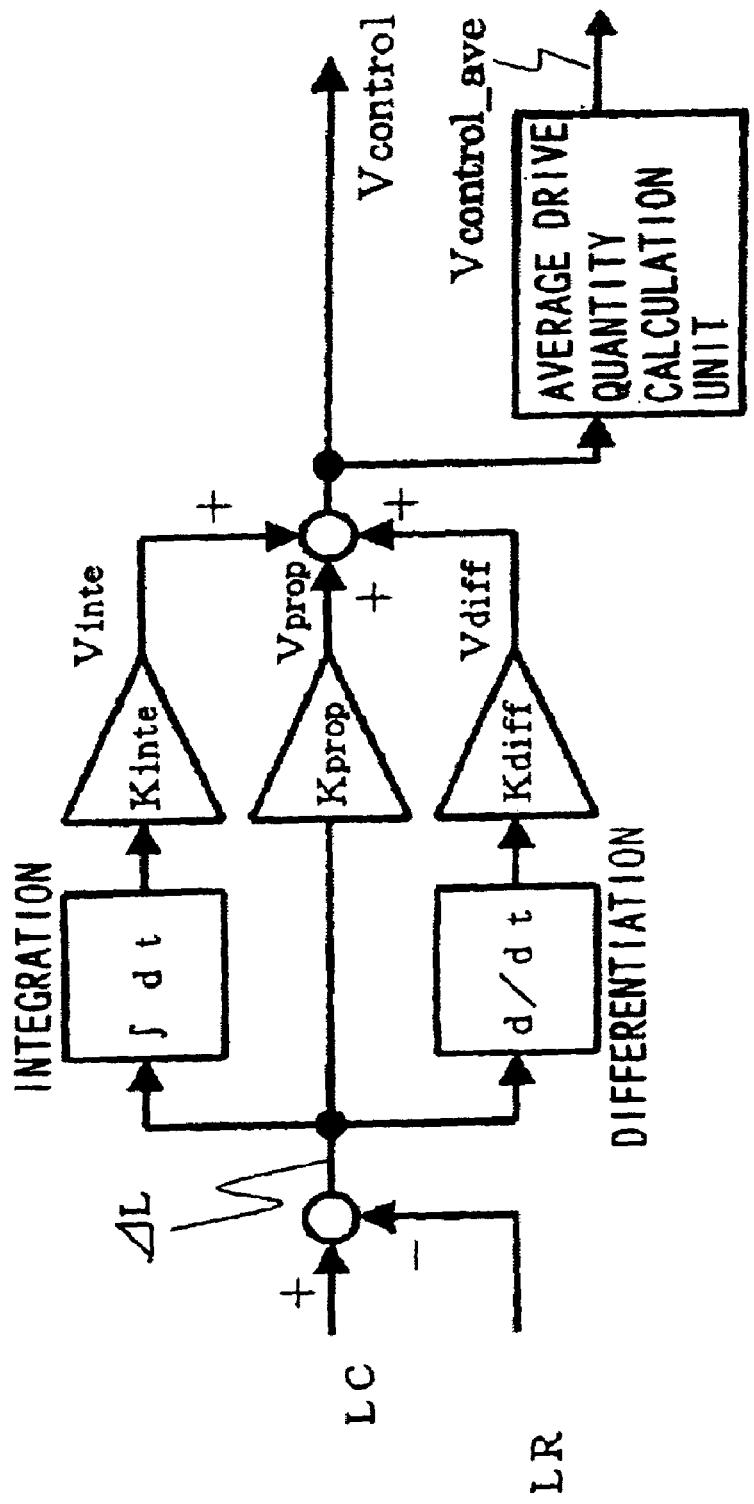
FIG. 2 is a block diagram illustrating the calculation of a correction lens drive quantity and a correction lens average drive quantity.

FIG. 2 is a block diagram of the method for calculating the correction lens drive quantity Vcontrol adopted at the MCU 1. The control shown in FIG. 2 is achieved by adopting standard PID control (proportional integral-differential control) in the control of the correction lens 31. It is to be noted that while FIG. 2 shows control implemented along either the X axis or the Y axis, similar control is implemented along the other axis as well.

When a blur correction is executed, a target position LC for the correction lens 31 is calculated. The correction lens 31 is moved to the target position LC to correct the image blur having occurred at the interchangeable lens 35 in a desirable manner. When calculating the correction lens target position LC, the angular speed having manifested at the interchangeable lens 35 is first detected by using a vibration gyro or the like. Then, the angle of deflection having occurred at the interchangeable lens 35 is calculated by integrating the detected angular speed. The correction lens target position LC to which the correction lens needs to move to correct the image blur can then be calculated based upon the deflection angle thus calculated.

It is to be noted that the correction lens target position LC is the desired target position to which the correction lens 31 is made to move as explained in detail later during the electromagnetic locking operation.

The correction lens drive quantity Vcontrol is the extent to which the correction lens 31 must be driven to reach the correction lens target position LC.

The MCU 1 in FIG. 2 calculates a difference ΔL between the correction lens position LR obtained by converting the analog output signal from the correction lens position detection circuit 11 to a digital signal and the correction lens target position LC constituting the drive target for the correction lens 31. It is to be noted that ΔL, which is the difference between the actual position LR and the target position LC of the correction lens 31, represents the control error having occurred in the control of the correction lens 31.

Next, the MCU 1 integrates the control error ΔL having been calculated and then calculates a drive quantity integral term Vinte by multiplying the integration results with a constant Kinte. The drive quantity integral term Vinte is expressed as in (expression 1) below.

$$V\text{inte} = K\text{inte} \times \int \Delta L \, dt \qquad \text{(expression 1)}$$

It is to be noted that the drive quantity integral term Vinte is initialized to 0 when starting drive of the correction lens 31, e.g., when starting a blur correction.

The MCU 1 calculates a drive quantity proportional term Vprop by multiplying the control error ΔL having been calculated with a constant Kprop. The drive quantity proportional term Vprop is expressed as in (expression 2) below.

$$V\text{prop} = K\text{prop} \times \Delta L \qquad \text{(expression 2)}$$

The MCU 1 differentiates the control error ΔL having been calculated and then calculates a drive quantity differential term Vdiff by multiplying the differentiation results with a constant Kdiff. The drive quantity differential term Vdiff is expressed as in (expression 3) below.

$$V\text{diff} = K\text{diff} \times d\Delta L/dt \qquad \text{(expression 3)}$$

In addition, the MCU 1 calculates a correction lens drive quantity Vcontrol expressed as in (expression 4) below by adding the drive quantity integral term Vinte, the drive quantity proportional term Vprop and the drive quantity differential term Vdiff.

$$V\text{control} = V\text{inte} + V\text{prop} + V\text{diff} \qquad \text{(expression 4)}$$

As described above, the control error ΔL with regard to the correction lens 31 is calculated by using the correction lens target position LC and the correction lens position LR. Then, the correction lens drive quantity Vcontrol is calculated based upon the control error ΔL, the results obtained by integrating the control error ΔL and the results obtained by differentiating the control error ΔL as indicated in (expression 1)~(expression 4). It is to be noted that in digital control implemented by utilizing the MCU 1 or the like, the correction lens drive quantity Vcontrol and the like are usually calculated through an arithmetic operation executed repeatedly over predetermined time intervals, i.e., control sampling intervals Δts.

In this case, a drive quantity integral term Vinte (i), a drive quantity proportional term Vprop (i), a drive quantity differential term Vdiff (i) and a correction lens drive quantity Vcontrol (i) corresponding to an ith (i=0, 1, 2, . . . ) control sampling can be calculated by using the following expressions (5)~(8) based upon a control error ΔL (i) calculated for the ith control sampling.

$$V_{inte}(i) = K_{inte} \times \sum_{j=0}^{i} \Delta L(j) \times \Delta ts \qquad \text{(expression 5)}$$

$$V\text{prop}(i) = K\text{prop} \times \Delta L(i) \qquad \text{(expression 6)}$$

$$V\text{diff}(i) = K\text{diff} \times \{\Delta L(i) - \Delta L(i-1)\}/\Delta ts \qquad \text{(expression 7)}$$

$$V\text{control}(i) = V\text{inte}(i) + V\text{pro}(i) + V\text{diff}(i) \qquad \text{(expression 8)}$$

It is to be noted that in (expression 5), the drive quantity integral term Vinte (i) is calculated through approximation by using a summation value of the control errors ΔL calculated over the individual control sampling intervals Δts as the integral value ∫ΔLdt in (expression 1). In addition, the drive quantity differential term Vdiff (i) in (expression 7) is calculated through approximation by using the extent of change manifesting during the control sampling interval Δts as the differential value d ΔL/dt in (expression 3). It is to be noted that i (i=0, 1, 2, . . . ), which indicates the number of control samplings executed, is set to 0 when starting drive of the correction lens, e.g., when starting a blur correction.

The MCU 1 controls the correction lens drive circuit 12 in conformance to the correction lens drive quantities Vcontrol along the X axis and the Y axis having been calculated as described above. The correction lens drive circuit 12 drives the X-axis correction lens drive coil 40a and the Y-axis correction lens drive coil 40b in conformance to signals provided by the MCU 1 and thus achieves drive control of the correction lens 31 along the X axis and the Y axis.

As explained above, the correction lens drive quantities Vcontrol which will set the correction lens position LR to the correction lens target position LC are calculated and power is supplied to the correction lens drive coils 40a and 40b in correspondence to the correction lens drive quantities Vcontrol thus calculated. As a result, drive control is implemented to set the correction lens 31 approximately to the correction lens target position LC is implemented.

(2) Correction Lens Average Drive Quantity Calculation

Next, correction lens average drive quantities Vcontrol_ave are calculated by using the X-axis and Y-axis correction lens drive quantities Vcontrol that have been calculated as described above. A correction lens drive average quantity Vcontrol_ave can be calculated by using the moving average or a low pass filter. First, a method of calculating a correction lens average drive quantity by using the moving average is explained.

(2-1) Moving Average Method

The correction lens average drive quantity Vcontrol_ave is calculated as the moving average of extents of control implemented at the P I D control unit, i.e., the correction lens drive quantity Vcontrol calculated at the MCU 1 as described earlier.

More specifically, the MCU 1 calculates the correction lens average drive quantity Vcontrol_ave (i) with the formula presented in (expression 9) below by using the correction lens drive quantity Vcontrol (i) calculated for each control sampling interval $\Delta ts$ through (expression 8).

$$V_{control\_ave}(i) = \frac{\sum_{j=1-N}^{i}(V_{control}(j))}{N+1} \quad \text{(expression 9)}$$

It is to be noted that $i \geq N$ is true for the number of control samplings i in (expression 9). N+1 represents the number of sets of data used to calculate the moving average and N satisfies the condition expressed as $N \geq 1$. If the number of control samplings i is smaller than N, the formula presented in (expression 10) below is used to calculate the average of i correction lens drive quantities Vcontrol (i) as the correction lens average drive quantity Vcontrol_ave (i).

$$V_{control\_ave}(i) = \frac{\sum_{j=0}^{i}(V_{control}(j))}{i+1} \quad \text{(expression 10)}$$

(2-2) Low Pass Filter LPF Method

Next, the method of calculating the correction lens average drive quantity by using a low pass filter LPF is explained. The correction lens average drive quantity Vcontrol_ave is calculated through low pass filter LPF processing executed by using a predetermined time constant $\tau ave$ on the correction lens drive quantity Vcontrol having been calculated as described earlier.

Figure 3:
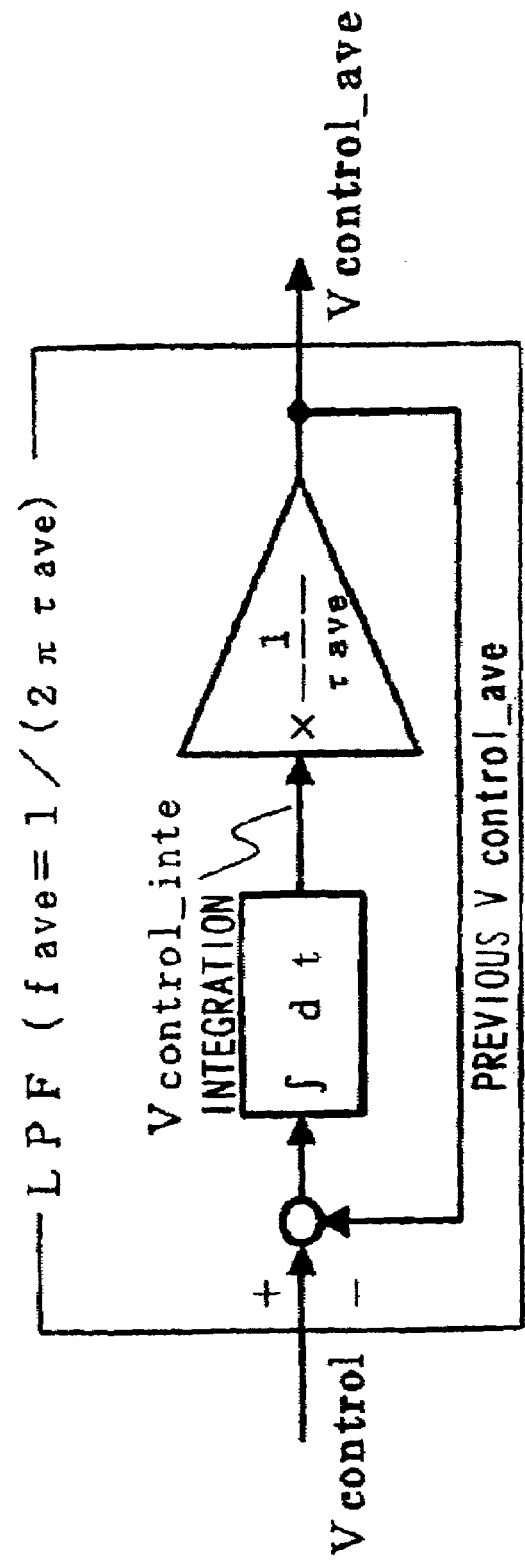
FIG. 3 is a block diagram illustrating the calculation of a correction lens average drive quantity.

FIG. 3 is a block diagram illustrating how the correction lens average drive quantity Vcontrol_ave is calculated based upon the correction lens drive quantity Vcontrol through this method. As shown in FIG. 3, the correction lens average drive quantity Vcontrol_ave corresponding to the preceding control sampling is subtracted from the correction lens drive quantity Vcontrol, and then the subtraction results are integrated. The integration results are then multiplied by $1/\tau ave$ and thus, the correction lens average drive quantity Vcontrol_ave is calculated.

The correction lens average drive quantity Vcontrol_ave (i) can be calculated through the formula presented in (expression 11) below through summation approximation to the integral executed by using the correction lens drive quantity Vcontrol (i) corresponding to the ith control sampling and the correction lens average drive quantity Vcontrol_ave (i) corresponding to the (i−1)th control sampling.

$$V_{control\_ave}(i) = \frac{1}{\tau_{ave}} \times \sum_{j=0}^{i}(V_{control}(j) - V_{control\_ave}(j-1)) \times \Delta ts \quad \text{(expression 11)}$$

It is to be noted that when the correction lens average drive quantity Vcontrol_ave is calculated through LPF processing, neither the preceding correction lens average drive quantity Vcontrol_ave in FIG. 3 nor the correction lens average drive quantity Vcontrol_ave (j−1) corresponding to the preceding control sampling in (expression 11) is available at the calculation start. In this case, the value of 0 is used for these quantities for simplification.

Figure 4:
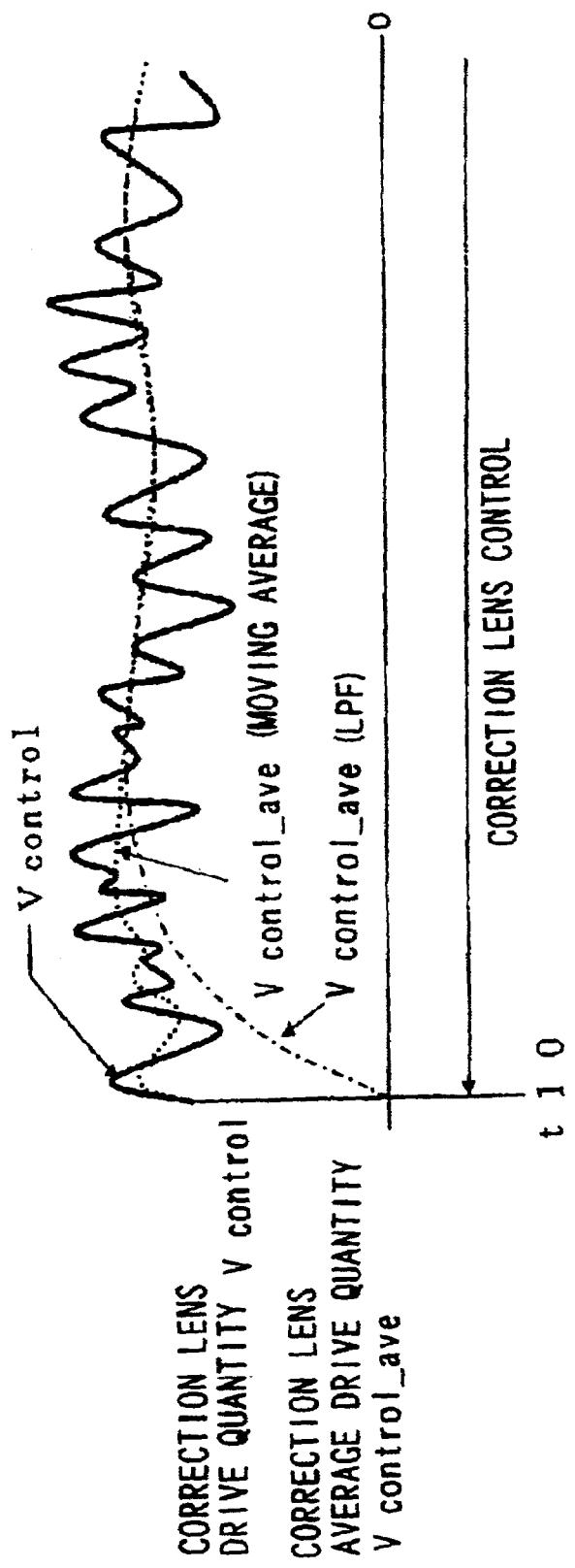
FIG. 4 shows changes occurring in the correction lens drive quantity and the correction lens average drive quantity.

FIG. 4 shows the changes in the correction lens drive quantity Vcontrol and the correction lens average drive quantities Vcontrol_ave calculated through the two different methods described above along the time axis. In FIG. 4, the solid line represents the change in the correction lens drive quantity Vcontrol, the dotted line represents the change in the correction lens average drive quantity Vcontrol_ave obtained through the moving average and the one-point chain line represents the change in the correction lens average drive quantity Vcontrol_ave obtained through the LPF processing.

The correction lens drive quantity Vcontrol is calculated so as to make the correction lens 31 conform to the correction lens target position LC as explained earlier. For this reason, the calculated correction lens drive quantity Vcontrol is usually represented as a high-frequency waveform, as shown in FIG. 4. The correction lens average drive quantity Vcontrol_ave that does not contain a high-frequency component is obtained by averaging the correction lens drive quantity Vcontrol through the formula in (expression 9) or (expression 10), or by executing LPF processing on the correction lens control quantity Vcontrol as shown in FIG. 3 or as indicated in (expression 11).

In FIG. 4, drive of the correction lens 31 starts as, for instance, a blur correction is initiated at the time t10. Concurrently as the calculation of the correction lens drive quantity Vcontrol starts, a calculation of the correction lens average drive quantity Vcontrol_ave is initiated. The correction lens average drive quantity Vcontrol_ave is stabilized over time, and is represented as a waveform achieved by eliminating the high-frequency component from the correction lens drive quantity Vcontrol.

It is to be noted that this high-frequency component removing effect can be increased by raising the value N in (expression 9) or raising the value of the time constant $\tau ave$ in the LPF processing when calculating the correction lens average drive quantity Vcontrol_ave. An appropriate value should be set in advance for the value N or the time constant $\tau ave$. The correction lens average drive quantity Vcontrol_ave is calculated both along the X axis and along the Y axis.

The correction lens drive quantities Vcontrol and the correction lens average drive quantities Vcontrol_ave are calculated as described above. These arithmetic operations are repeatedly executed during the time period elapsing after a start of drive of the correction lens 31, e.g., a start of a blur correction, until the drive control for the correction lens 31 ends.

(3) Detection of Gravitational Direction

Next, the method of detecting the direction along which the gravitational force is applied to the interchangeable lens 35 by using the correction lens average drive quantity Vcontrol_ave along the X-axis direction and the correction lens average drive quantity Vcontrol_ave along the Y-axis direction having been calculated as described above is explained.

Figure 5:
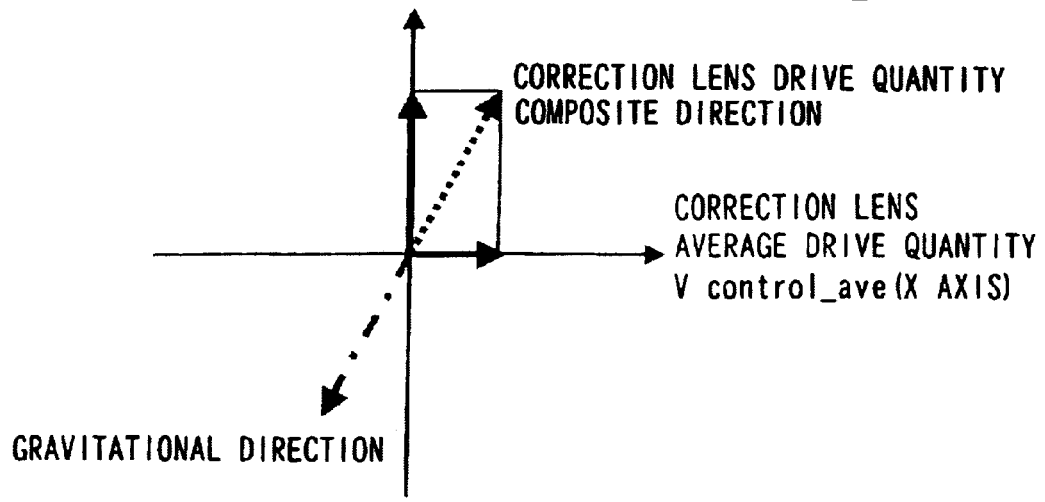
FIG. 5 shows the relationship between the correction lens average drive quantities and the gravitational direction.

FIG. 5 shows the X-axis and y-axis correction lens average drive quantities Vcontrol_ave and an estimated gravitational direction. As described earlier, when the drive control of the correction lens 31 is not implemented, the correction lens 31 moves downward along the gravitational direction within its movement range due to its own weight. When the drive control of the correction lens 31 is implemented, on the other hand, the correction lens 31 needs to be driven by an extent which is large enough to compensate the displacement of the correction lens 31 along the gravitational direction caused by its own weight. The correction lens average drive quantities Vcontrol_ave may be regarded to represent a substantial drive quantity by which the correction lens 31 needs to be driven to correct the displacement of the correction lens 31 caused by its own weight.

The dotted line in FIG. 5 indicates a composite direction of the X-axis and Y-axis correction lens average drive quantities Vcontrol_ave. The direction opposite from the composite direction of the correction lens average drive quantities, which is indicated by the one-point chain line in FIG. 5, is the direction of the gravitational force applied to the correction lens 31.

Thus, by using the X-axis and Y-axis correction lens average drive quantities Vcontrol_ave, the direction of the gravitational force applied to the interchangeable lens 35 can be detected. However, when the camera is operated with the interchangeable lens 35 facing upward (along the +Y-axis direction) or downward (along the −Y direction) along the vertical direction, the gravitational force is applied to the interchangeable lens 35 along the optical axis 33. Since the gravitational force hardly affects the electromagnetic locking control of the correction lens 31 in such a case, the gravitational force applied along the optical axis is not detected.

The structure of the locking device for the blur correction optical system, the detection of the gravitational direction and the like according to the present invention have been explained above. The following is an explanation of the electromagnetic locking operation executed by the locking device of the blur correction optical system according to the present invention.

First Embodiment

In the first embodiment, the position at which the correction lens 31 is electromagnetically locked is adjusted in correspondence to the direction of the gravitational force applied to the correction lens 31.

Figure 6:
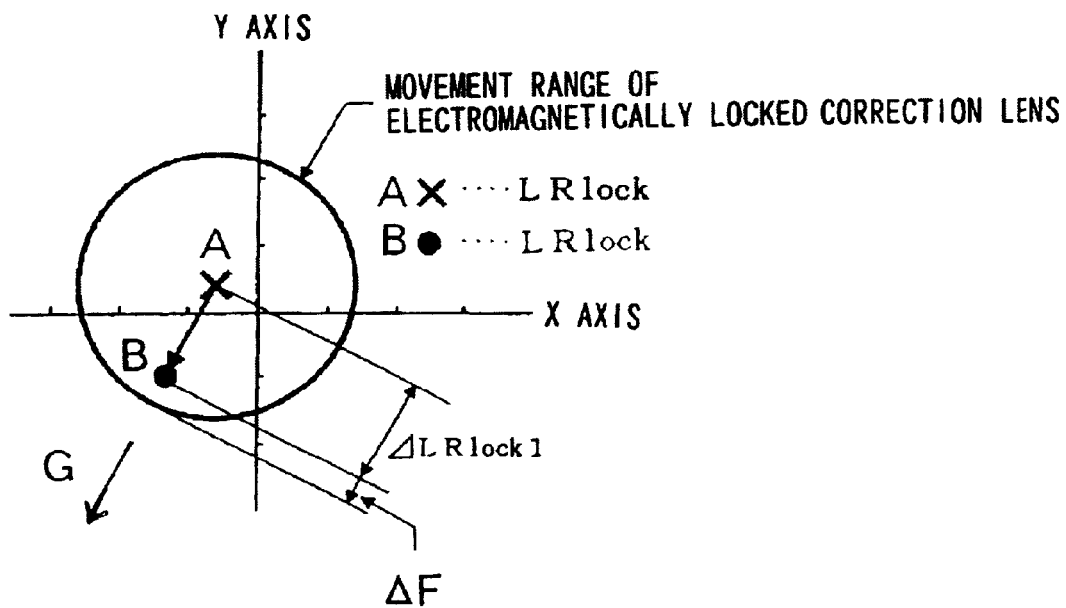
FIG. 6 schematically illustrates the relationship between the gravitational direction and an electromagnetic locking position within a correction lens movement range.

FIG. 6 shows the movement range over which the correction lens 31 is allowed to move over the X-Y plane in the electromagnetically locked state, i.e., the range of the electromagnetic locking play. The position LR of the correction lens 31 in the electromagnetically locked state is set within the movement range shown in FIG. 6. In FIG. 6, point A indicates an electromagnetic locking center position LRlock at the center of the electromagnetic locking play and point B indicates an electromagnetic locking position LRlock' at which the correction lens 31 is actually electromagnetically locked.

The arrow G in FIG. 6 indicates the direction of the gravitational force applied to the correction lens 31, which corresponds to the gravitational direction detected based upon the composite direction of the correction lens average drive quantities, as shown in FIG. 5. It is to be noted that due to dimensional inconsistency in parts or the like, the electromagnetic locking center position LRlock and the origin point of the X and Y axes do not match in FIG. 6. After a blur correction, the correction lens 31 is driven to the electromagnetic locking position LRlock' set in correspondence to the gravitational direction and then becomes electromagnetically locked.

The electromagnetic locking position LRlock' is set at a point away from the electromagnetic locking center position LRlock by a specific distance ΔLRlock1 (hereafter referred to as an electromagnetic locking position correction quantity) along the detected gravitational direction.

Since the electromagnetic locking center position LRlock is not uniform among individual products, the electromagnetic locking center position of a given product is determined through adjustment and is stored into the EEPROM 14 as an adjustment value. The MCU 1 uses the electromagnetic locking center position LRlock stored in the EEPROM 14 by reading it out with the required timing. In addition, the electromagnetic locking position correction quantity ΔLRlock1 is set to the largest possible value within the allowable range while ensuring that the electromagnetic locking position LRlock' away from the electromagnetic locking center position LRlock along the gravitational direction remains at least within the electromagnetic locking play range. The electromagnetic locking position correction quantity ΔLRlock1 is stored in the EEPROM 14 and is read out whenever necessary.

When electromagnetically locking the correction lens 31 after the blur correction operation, the correction lens 31 is driven to the electromagnetic locking position LRlock' which is away from the electromagnetic locking center position LRlock at the center of its movement range by the electromagnetic locking position correction quantity ΔLRlock1 along the gravitational direction, as described above. The correction lens 31 having been moved to the electromagnetic locking position LRlock' is then electromagnetically locked by the locking pin 50. Thus, the range over which the electromagnetically locked correction lens 31 is allowed to move along the gravitational direction, i.e., the distance between the correction lens 31 and the end of the electromagnetic locking play, is only ΔF in FIG. 6. When the drive of the correction lens 31 ends after electromagnetically locking the correction lens 31, the correction lens 31 moves downward along the gravitational direction due to its own weight and the like as explained earlier. However, the distance ΔF over which the correction lens 31 is allowed to move under these circumstances is much smaller than the distance over which the correction lens 31 having been driven to and electromagnetically locked at the electromagnetic locking center position LRlock would be allowed to move. As a result, the photographer does not need to be disconcerted by the viewfinder image becoming blurred due to a significant displacement of the electromagnetically locked correction lens 31 along the gravitational direction.

In addition, if the electromagnetic locking play range is inconsistent among individual products, the electromagnetic locking position correction quantity ΔLRlock1 stored in the EEPROM 14 can be adjusted for a given product in conformance to the specific size and shape of the electromagnetic locking play range in the particular product. Also, part of the hardware shown in FIG. 1 may be commonly adopted in products with different electromagnetic locking mechanism specifications or the like in order to reduce the production costs and the design costs. In such a case, the electromagnetic locking position correction quantity ΔLRlock1 stored in the EEPROM 14 can be adjusted with ease for a given product in conformance to the specific size and shape of the electromagnetic locking play range in the particular product.

An example in which the electromagnetic locking position LRlock' is set along the detected gravitational direction has been explained above. However, the method that may be adopted to set the electromagnetic locking position LRlock' along the gravitational direction is not limited to that explained in reference to the first embodiment. Another method that may be adopted to set the electromagnetic locking position LRlock' is explained below.

Figure 7:
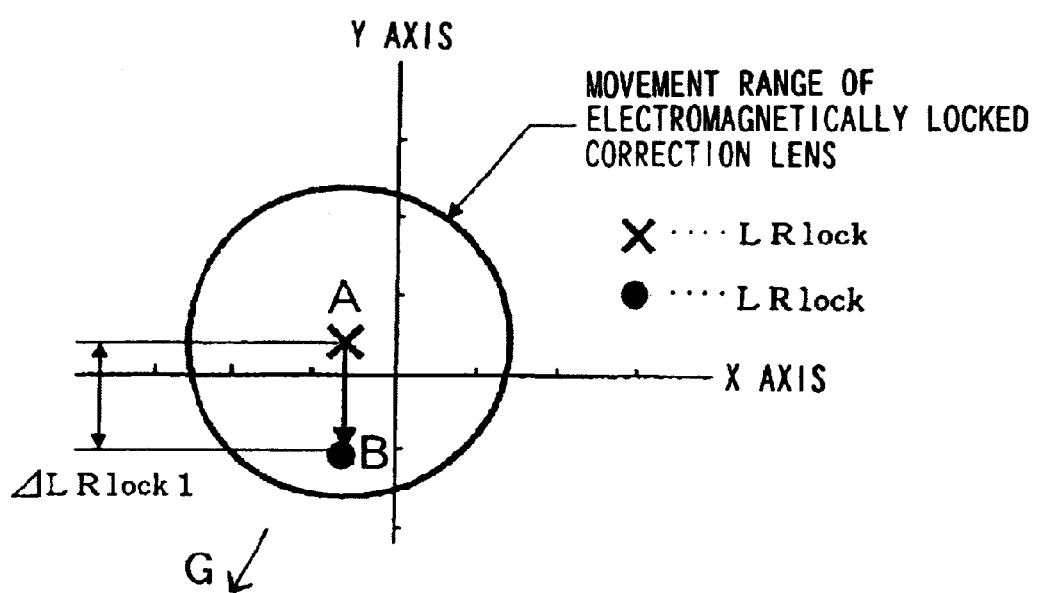
FIG. 7 schematically illustrates the relationship between the gravitational direction and the electromagnetic locking position within the correction lens movement range.

FIG. 7 shows the relationship between the movement range over which the correction lens 31 in the electromagnetically locked state is allowed to move and the electromagnetic locking position LRlock'. The arrow G indicates the direction of the gravitational force actually applied to the correction lens 31 in FIG. 7, and this gravitational direction indicated by the arrow G corresponds to the gravitational direction detected based upon the composite direction of the correction lens average drive quantities, as shown in FIG. 5.

When a user operates a camera, a video camera, binoculars or the like, the attitudes that the apparatus may assume during the operation are usually limited to a few. For instance, a single lens reflex camera is almost always held either at a so-called horizontal position with the X axis shown in FIG. 13 set along the horizontal direction or at a so-called vertical position with the X axis set along the vertical direction. In FIG. 5, however, both the X-axis correction lens average drive quantity Vcontrol_ave and the Y-axis correction lens average drive quantity Vcontrol_ave take on large values and the detected gravitational direction extends diagonally. This means that the user is holding the camera along a diagonal direction. However, in reality, a camera is hardly ever held diagonally during an operation and normally, either one of the X-axis and Y-axis correction lens average drive quantities Vcontrol_ave takes on a very large value and the other correction lens average drive quantity takes on a very small value.

Accordingly, based upon the X-axis and Y-axis correction lens average drive quantities Vcontrol_ave, either the X-axis direction or the Y-axis direction is designated as the gravitational direction for convenience. In more specific terms, the X-axis correction lens average drive quantity Vcontrol_ave and the Y-axis correction lens average drive quantity Vcontrol_ave are compared with each other. And the opposite direction from the direction of the correction lens average drive quantity Vcontrol_ave with a larger value is designated as the gravitational direction. Since the absolute value of the Y-axis correction lens average drive quantity Vcontrol_ave is greater than the absolute value of the X-axis correction lens average drive quantity Vcontrol_ave, the opposite direction from the Y-axis correction lens average drive quantity Vcontrol_ave, i.e., the −Y-axis direction, is designated as the gravitational direction in FIG. 5.

While the direction of the actual gravitational force applied to the correction lens 31 is indicated by the arrow G in FIG. 7, the −Y-axis direction is designated as the gravitational direction in FIG. 7 for simplification as explained above. Accordingly, a point away from the electromagnetic locking center position LRlock by the electromagnetic locking position correction quantity ΔLRlock1 along the −Y-axis direction is set as the electromagnetic locking position LRlock'.

The methods of setting the position to which the correction lens 31 is to be driven for an electromagnetic locking operation have been explained above. Next, the operations executed in the MCU 1 to implement the blur correction control and the electromagnetic locking control in the first embodiment are explained in detail in reference to FIG. 8.

Figure 8:
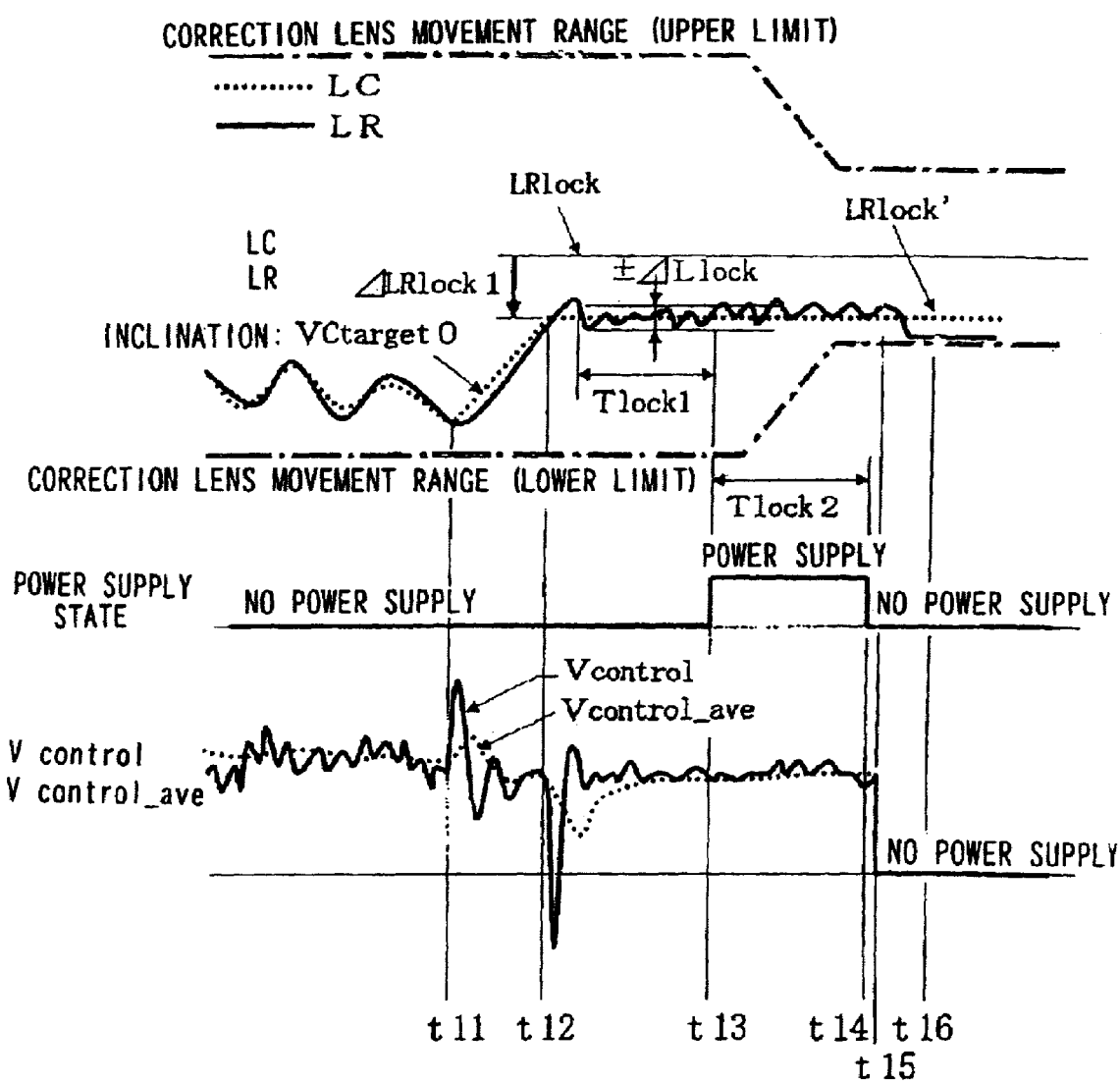
FIG. 8 presents a timing chart of the correction lens electromagnetic locking operation executed in a first embodiment of the present invention.

FIG. 8 is a time chart of the operations from the blur correction through the electromagnetic locking operation executed in the MCU 1. FIG. 8 shows changes occurring in the correction lens position LR (solid line) and the correction lens target position LC (dotted line) relative to the correction lens movement range (one-point chain line), the state of power supply to the electromagnetic locking coil 52 and changes occurring in a correction lens drive quantity Vcontrol (solid line) and a correction lens average drive quantity Vcontrol_ave (dotted line). It is to be noted that FIG. 8 shows the operation executed along either the X axis or the Y axis. Since the operation executed along the other axis is identical, its illustration is omitted. In addition, the gravitational direction extends downward in FIG. 8.

In FIG. 8, the blur correction operation is executed to correct the image blur prior to the time t11. In the blur correction operation, the correction lens target position LC is determined in correspondence to the extent of vibration to which the camera is subjected, detected by a vibration gyro (not shown) or the like. The MCU 1 calculates the X-axis and Y-axis correction lens drive quantities Vcontrol through, for instance, the method shown in FIG. 2 in conformance to the correction lens target position LC determined so as to correct the image blur. The MCU 1 outputs a command for the correction lens drive circuit 12 to drive the correction lens 31 over the calculated correction lens drive quantities Vcontrol and thus controls the drive of the correction lens 31 along the X axis and the Y axis.

As shown in FIG. 8, the correction lens drive quantity Vcontrol is represented by an unsmooth high-frequency waveform. The gravitational direction detected by using such correction lens drive quantities Vcontrol may be erroneous. Accordingly, the high-frequency component in the correction lens drive quantities Vcontrol is removed by calculating the correction lens average drive quantities Vcontrol_ave. More specifically, the high-frequency component is eliminated by calculating the moving averages of the correction lens drive quantities Vcontrol or by executing LPF processing on the correction lens drive quantities Vcontrol as explained earlier.

The correction lens average drive quantity Vcontrol_ave indicated by the dotted line in FIG. 8 is sufficiently stable. As explained earlier, by raising the value N used to calculate the moving averages of the correction lens drive quantities Vcontrol or by raising the value of the time constant τave used for the LPF processing executed on the correction lens drive quantities Vcontrol, the high-frequency component in the correction lens drive quantities Vcontrol can be eliminated more effectively. However, if the high-frequency component removing effect with which the high-frequency component in the correction lens drive quantities Vcontrol is eliminated is improved, the response of the MCU 1 to a sudden change in the attitude of the interchangeable lens 35, e.g., when the user switches the camera position from the horizontal position to the vertical position, becomes poor. Accordingly, if the electromagnetic locking operation is undertaken upon ending the blur correction immediately after suddenly changing the position of the interchangeable lens 35, the gravitational direction may be erroneously detected. For this reason, an appropriate value should be set for the value N or the time constant τave by taking into consideration the optimal balance between the required high-frequency component removal rate that needs to be achieved when eliminating the high-frequency component contained in the correction lens drive quantities Vcontrol and the desirable response speed to be achieved when calculating the correction lens average drive quantities Vcontrol_ave after the attitude of the interchangable lens 35 is changed.

Upon completing the blur correction operation at the time point t11, the MCU 1 shifts into the operation for electromagnetically locking the correction lens 31.

At the time point t11 at which the blur correction operation is completed, the MCU 1 detects the direction of the gravitational force applied to the correction lens 31 as described above by using the X axis and Y-axis correction lens average drive quantities Vcontrol_ave having been calculated immediately before the time point t11. In this example, the gravitational direction is detected to run downward in the figure. The MCU 1 sets a point offset from the electromagnetic locking center position LRlock at the center of the movement range of the correction lens 31 by the electromagnetic locking position correction quantity ΔLRlock1 along the gravitational direction as the electromagnetic locking position LRlock'.

After setting the electromagnetic locking position LRlock' at the time point t11, a correction lens target position LC is set by designating the current correction lens target position LC as the initial value and the electromagnetic locking position LRlock' having been set as the final target value. More specifically, during the period elapsing between the time point t11 and the time point t12, the correction lens target position LC is gradually changed at a predetermined inclination, i.e., at a predetermined speed VCtarget0, so that the correction lens target position LC is set to the electromagnetic locking position LRlock' at the time point t12.

The MCU 1 calculates the correction lens drive quantities Vcontrol as described above based upon the correction lens position LR and the correction lens target position LC, and drives the correction lens 31 accordingly by controlling the correction lens drive circuit 12. As a result, the correction lens 31 is controlled in conformance to the correction lens target position LC and is made to gradually reach the electromagnetic locking position LRlock'.

If the correction lens target position LC is made to change in a step to the electromagnetic locking position LRlock' after ending the blur correction operation at the time point t11, an overshoot may occur in the control of the correction lens 31. However, since the correction lens target position LC is gradually changed at the predetermined speed VCtarget0 during the time period elapsing between the time point t11 and the time point t12, an overshoot does not occur in the control of the correction lens 31 in the embodiment.

After the correction lens target position LC matches the electromagnetic locking position LRlock' at the time point t12, a decision is made as to whether or not the correction lens position LR has stabilized. Namely, during the time period elapsing between the time point t12 and a time point t13, a decision is made as to whether or not the correction lens position LR has definitely moved close to the correction lens target position LC, i.e., the electromagnetic locking position LRlock'.

More specifically, a decision is made as to whether or not the correction lens position LR continuously remains within a predetermined range ±ΔLlock relative to the correction lens target position LC, i.e., relative to the electromagnetic locking position LRlock', over a predetermined length of time Tlock1. It is to be noted that the decision as to whether or not the correction lens position LR is definitely in the vicinity of the electromagnetic locking position LRlock' is made separately along the X axis and the Y axis. In this example, it is decided that the correction lens 31 has definitely reached the vicinity of the electromagnetic locking position LRlock' at the time point t13 by which the correction lens position LR has continuously remained within the predetermined range ±ΔLlock over the predetermined length of time Tlock1 following the time point t12.

After deciding at the time point t13 that the correction lens 31 has definitely reached the vicinity of the electromagnetic locking position LRlock', the correction lens target position LC is fixed at the electromagnetic locking position LRlock'. In other words, the drive of the correction lens 31 is controlled so that the correction lens 31 remains at the electromagnetic locking position LRlock'. At this time, the MCU 1 controls the electromagnetic lock drive circuit 13 to supply power to the electromagnetic locking coil 52 along the electromagnetic locking direction over a specific length of time Tlock2, i.e., during the time period elapsing between the time point t13 and a time point t14. As a result, the locking pin 50 is inserted at the locking hole 43a and the correction lens 31 becomes electromagnetically locked. It is to be noted that as shown in FIG. 8, when the locking pin 50 is inserted at the locking hole 43a, the correction lens movement range indicated by the one-point chain line becomes narrower.

After ending the power supply to the electromagnetic locking coil 52 at the time point t14, the operations having been executed to that time point to calculate the correction lens drive quantities Vcontrol and to implement the drive control on the correction lens 31 by using the correction lens drive quantities Vcontrol, is completed. In addition, it is ensured that no power is supplied to the X-axis correction lens drive coil 40a and the Y-axis correction lens drive coil 40b by controlling the correction lens drive circuit 12. As a result, the correction lens position LR starts to move along the gravitational direction, i.e., downward in FIG. 8, due to the weight of the correction lens itself. The correction lens 31 moves to the end of the movement range and then stops.

As described above, during the period elapsing between the time point t11 and the time point t13 after the end of the blur correction operation, the gravitational direction is detected by using the correction lens average drive quantities Vcontrol_ave having been calculated immediately before the end of the blur correction operation. Then, the correction lens 31 is caused to move with a high degree of reliability to the electromagnetic locking position LRlock' which is offset by the electromagnetic locking position correction quantity ΔLRlock1 along the detected gravitational direction relative to the electromagnetic locking center position LRlock. FIG. 9A shows the positional relationship between the correction lens 31 and the locking pin 50 at the time point t13. As shown in FIG. 9A, the locking pin 50 is attached to the holding plate 53 at the time point t13.

During the time period elapsing between the time point t13 and the time point t14, power is supplied to the electromagnetic locking coil 52 along the electromagnetic locking direction while controlling the drive of the correction lens 31 so as to retain the correction lens 31 at the electromagnetic locking position LRlock'. As a result, the locking pin 50 is inserted at the locking hole 43*a* and the correction lens 31 becomes electromagnetically locked. FIG. 9B shows the positional relationship between the correction lens 31 and the locking pin 50 at the time point t14. As shown in FIG. 9B, the locking pin 50 is inserted at all the locking hole 43*a* at the time point t14. At the same time, the drive of the correction lens 31 is still controlled so as to retain the correction lens 31 at the electromagnetic locking position LRlock'.

As the power supply to the correction lens drive coils 40*a* and 40*b* stops at the time point t15, the drive control of the correction lens 31 ends. As a result, the correction lens 31 is allowed to move downward by a small extent along the gravitational direction and stops at the end of the electromagnetic locking play range, i.e., at the end of the correction lens movement range. FIG. 9C shows the positional relationship between the correction lens 31 and the locking pin 50 at a time point t16. As shown in FIG. 9C, the moving member 43 is in contact with the locking pin 50 inserted at the locking hole 43*a* at the time point t16.

As explained above, during the electromagnetic locking operation, the position LRlock' to which the correction lens 31 is to be driven is set at a point offset from the electromagnetic locking center position LRlock by the electromagnetic locking position correction quantity ΔLRlock1 along the gravitational direction in the first embodiment. As a result, after ending the drive of the correction lens 31 upon achieving the electromagnetic lock, the correction lens 31 is allowed to move along the gravitational direction only by an extremely small extent. Thus, the disconcerting phenomenon of the viewfinder image becoming blurred after the correction lens 31 is electromagnetically locked becomes less noticeable.

Second Embodiment

The following is an explanation of the electromagnetic locking operation performed by the locking device for the blur correction optical system in the second embodiment, given in reference to the drawings. In the second embodiment, an electromagnetic lock is achieved by controlling the drive of the correction lens 31 to move the correction lens 31 to the electromagnetic locking center position LRlock without setting the electromagnetic locking position LRlock'. The detailed explanation will now be given of operations executed in the MCU 1 to implement the blur correction control and the electromagnetic locking control in the second embodiment with reference to FIG. 10.

Figure 10:
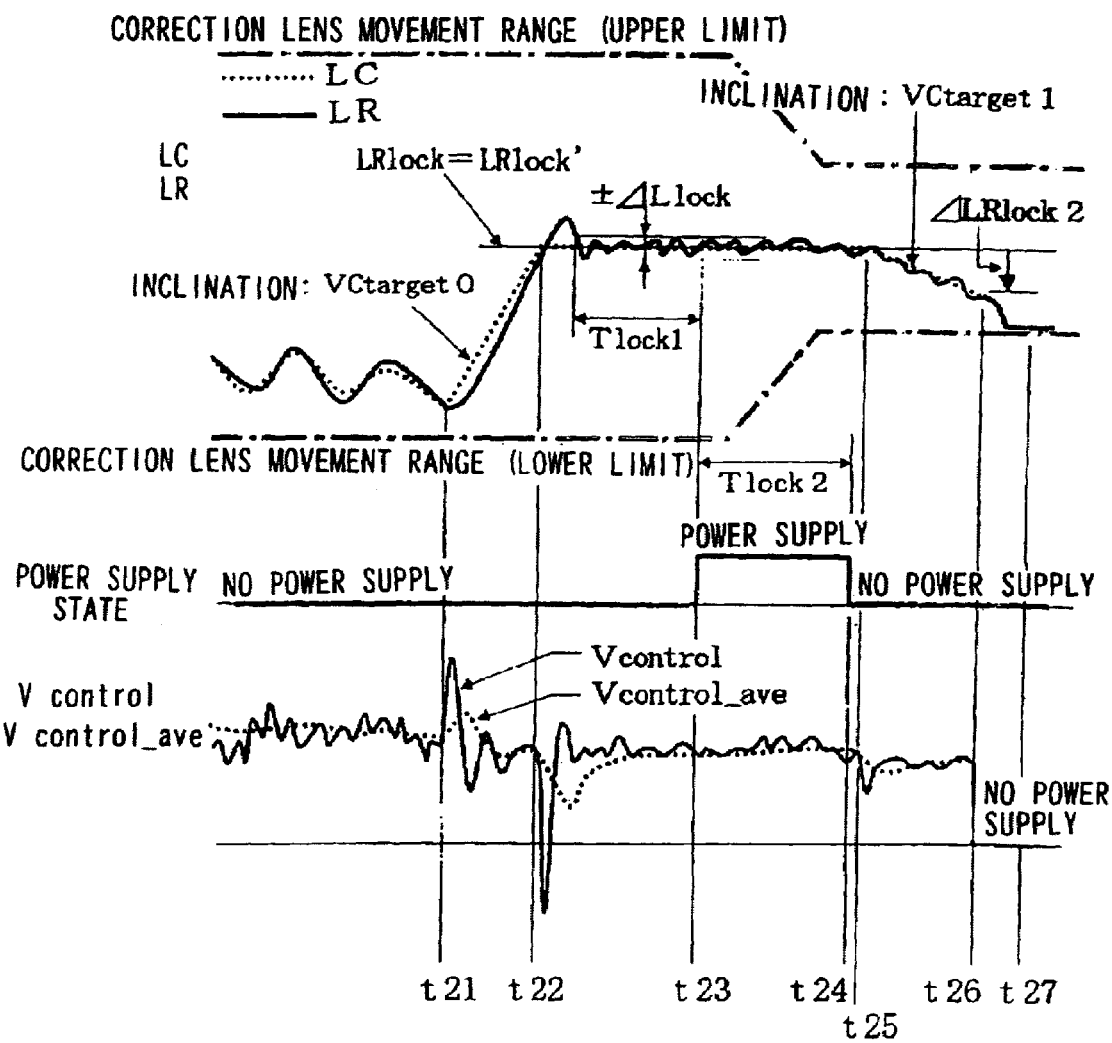
FIG. 10 presents a timing chart of the correction lens electromagnetic locking operation executed in a second embodiment of the present invention.

FIG. 10 is a time chart of the operations, from the blur correction operation through the electromagnetic locking operation executed in the MCU 1 in the second embodiment. FIG. 10 shows changes occurring in the correction lens position LR (solid line) and the correction lens target position LC (dotted line) relative to the correction lens movement range (one-point chain line), the state of power supply to the electromagnetic locking coil 52 and changes occurring in a correction lens drive quantity Vcontrol (solid line) and a correction lens average drive quantity Vcontrol_ave (dotted line). It is to be noted that FIG. 10 shows the operation executed along either the X axis or the Y axis. Since the operation executed along the other axis is identical, its illustration is omitted. In addition, the gravitational direction extends downward in FIG. 10.

The blur correction operation completed at a time point t21 is identical to that achieved in the first embodiment shown in FIG. 8.

At the time point t21 at which the blur correction operation is completed, the MCU 1 detects the direction of the gravitational force applied to the correction lens 31 by using the X-axis and Y-axis correction lens average drive quantities Vcontrol_ave having been calculated immediately before the time point t21, as in the first embodiment. In this example, the gravitational direction is detected to run downward in the figure.

In the second embodiment, after ending the blur correction operation at the time point t21, an electromagnetic lock is achieved by driving the correction lens 31 to the electromagnetic locking center position LRlock. In other words, the electromagnetic locking center position LRlock is the electromagnetic locking position LRlock'.

After detecting the gravitational direction at the timing t21, a correction lens target position LC is set by designating the current correction lens target position LC as the initial value and the electromagnetic locking center position LRlock as the final target value. More specifically, during the period elapsing between the time point t21 and a time point t22, the correction lens target position LC is gradually changed at a predetermined inclination, i.e., at a predetermined speed VCtarget0, so that the correction lens target position LC is set to the electromagnetic locking center position LRlock at the time point t22.

The MCU 1 calculates the correction lens drive quantities Vcontrol as described above based upon the correction lens position LR and the correction lens target position LC and drives the correction lens 31 accordingly by controlling the correction lens drive circuit 12. As a result, the correction lens 31 is controlled in conformance to the correction lens target position LC and is made to gradually reach the electromagnetic locking center position LRlock.

After the correction lens target position LC reaches the electromagnetic locking center position LRlock at the time point t22, a decision is made as to whether or not the correction lens position LR is definitely close to the correction lens target position LC, i.e., the electromagnetic locking center position LRlock.

More specifically, a decision is made as to whether or not the correction lens position LR continuously remains within a predetermined range ±ΔLlock relative to the correction lens target position LC, i.e., relative to the electromagnetic locking center position LRlock, over a predetermined length of time Tlock1, as in the first embodiment. It is to be noted that the decision as to whether or not the correction lens position LR is definitely in the vicinity of the electromagnetic locking center position LRlock is made separately along the X axis and the Y axis. In this example, it is decided that the correction lens 31 has definitely reached the vicinity of the electromagnetic locking center position LRlock with the timing t23.

After deciding at the time point t23 that the correction lens 31 has definitely reached the vicinity of the electromagnetic locking center position LRlock, the correction lens target position LC is fixed at the electromagnetic locking center position LRlock. In other words, the drive of the correction lens 31 is controlled so that the correction lens 31 remains at the electromagnetic locking center position LRlock. At this time, the MCU 1 controls the electromagnetic lock drive circuit 13 to supply power to the electromagnetic locking coil 52 along the electromagnetic locking direction over a specific length of time Tlock2, i.e., during the time period elapsing between the time point t23 and a time point t24. As a result, the locking pin 50 is inserted at the locking hole 43*a* and the correction lens 31 becomes electromagnetically locked. It is to be noted that as shown in FIG. 10, when the locking pin 50 is inserted at the locking hole 43a, the correction lens movement range indicated by the one-point chain line becomes narrower.

After ending the power supply to the electromagnetic locking coil 52 at the time point t24, the drive of the correction lens 31 is controlled so as to allow the correction lens 31 to gradually move along the gravitational direction in the second embodiment. And the drive control of the correction lens 31 ends immediately before the correction lens 31 reaches the electromagnetic locking play end, i.e., the end of the correction lens movement range.

More specifically, with the correction lens target position LC, i.e., the electromagnetic locking center position LRlock at a time point t25 designated as the initial value, the correction lens target position LC is changed along the detected gravitational direction at a predetermined inclination, i.e., at a predetermined speed VCtarget1 by a predetermined quantity ΔLRlock2. In this example, by a time point t26, the correction lens target position LC will have moved along the gravitational direction by a post-electromagnetic lock correction lens descending quantity ΔLRlock2 from the electromagnetic locking center position LRlock. It is to be noted that the gravitational direction has been detected at the time point t21 by using the correction lens average drive quantities Vcontrol_ave calculated immediately before the time point t21.

At this time, the MCU 1 calculates correction lens drive quantities Vcontrol based upon the correction lens position LR and the correction lens target position LC and controls the drive of the correction lens 31 by controlling the correction lens drive circuit 12. Thus, the correction lens 31 is controlled in conformance to the correction lens target position LC which has been set and is made to gradually move to the position which is offset from the electromagnetic locking center position LRlock by the post-electromagnetic lock correction lens descending quantity ΔLRlock2 along the gravitational direction.

After the correction lens target position LC is set to the point offset from the electromagnetic locking center position LRlock by the post-electromagnetic lock correction lens descending quantity ΔLRlock2 in the gravitational direction and the correction lens 31 reaches its vicinity, the operations having been executed to that time point to calculate the correction lens drive quantities Vcontrol and to implement the drive control on the correction lens 31 by using the correction lens drive quantities Vcontrol end. In addition, it is ensured that no power is supplied to the X-axis correction lens drive coil 40a and the Y-axis correction lens drive coil 40b by controlling the correction lens drive circuit 12. As a result, the correction lens position LR starts to move along the gravitational direction, i.e., downward in FIG. 10, due to the weight of the correction lens itself. The correction lens 31 moves to the end of the movement range and then stops.

The gravitational direction is detected by using the correction lens average drive quantities Vcontrol_ave calculated immediately before the time point t21, i.e., the values obtained before the start of the electromagnetic locking operation for the correction lens 31, as described above, since there is a risk of erroneously detecting the gravitational direction if the correction lens average drive quantities Vcontrol_ave calculated at or after the time point t21 are used. Namely, when moving the correction lens 31 from its position at the time point t21 to the electromagnetic locking center position LRlock, the correction lens drive quantities Vcontrol are likely to fluctuate due to a sudden change in the correction lens target position LC, which may affect the results of the calculation of the correction lens average drive quantities Vcontrol_ave and ultimately the results of the gravitational direction detection. For this reason, the gravitational direction is detected by using the correction lens average drive quantities Vcontrol_ave calculated immediately before the time point t21 in the second embodiment. However, the gravitational direction may be detected by using the correction lens average drive quantities calculated after the time point t21 instead as long as the fluctuations of the correction lens drive quantities Vcontrol attributable to the movement of the correction lens 31 to the electromagnetic locking center position LRlock are not significant enough to affect the detection of the gravitational direction.

Appropriate values are selected for the predetermined speed VCtarget1 and the post-electromagnetic lock correction lens descending quantity ΔLRlock2 and these values are stored into the EEPROM 14 in advance, so that they can be read out and used whenever necessary.

Figure 11A:
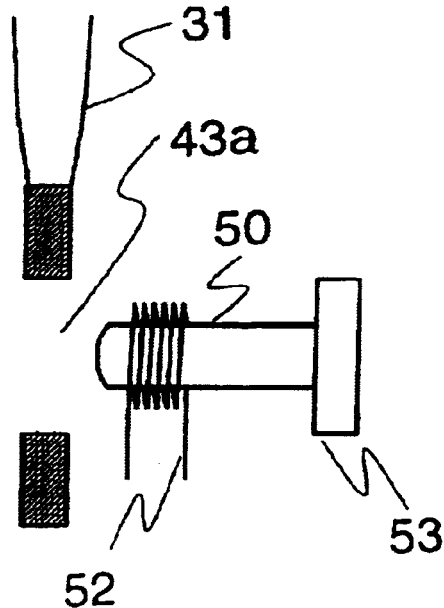
FIGS. 11A~11D schematically show the positional relationship among the correction lens, the locking hole and the locking pin achieved during the electromagnetic locking operation.

As described above, during the period elapsing between the time point t21 and the time point t23 after the end of the blur correction operation, the gravitational direction is detected by using the correction lens average drive quantities Vcontrol_ave having been calculated immediately before the end of the blur correction operation. Then, the correction lens 31 is caused to move to the electromagnetic locking center position LRlock with a high degree of reliability. FIG. 11A shows the positional relationship between the correction lens 31 and the locking pin 50 at the time point t23. As shown in FIG. 11A, the locking pin 50 is attached to the holding plate 53 at the time point t23.

Figure 11B:
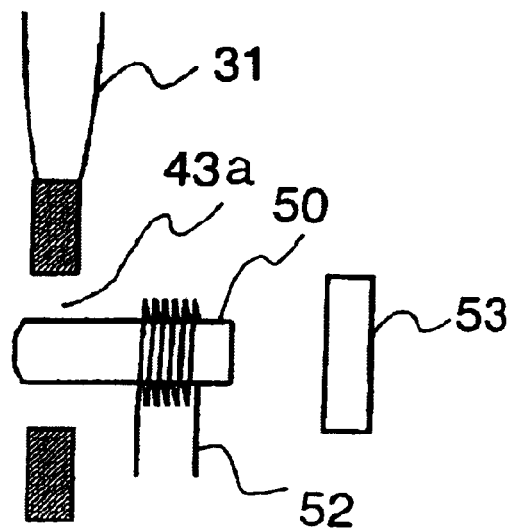

During the time period elapsing between the time point t23 and the time point t24, power is supplied to the electromagnetic locking coil 52 along the electromagnetic locking direction while controlling the drive of the correction lens 31 so as to retain the correction lens 31 at the electromagnetic locking center position LRlock. As a result, the locking pin 50 is inserted at the locking hole 43a and the correction lens 31 becomes electromagnetically locked. FIG. 11B shows the positional relationship between the correction lens 31 and the locking pin 50 at the time point t24. As shown in FIG. 11B, the locking pin 50 is inserted at the locking hole 43a at the time point t24. However, the drive of the correction lens 31 is still controlled so as to retain the correction lens 31 at the electromagnetic locking center position LRlock.

Figure 11C:
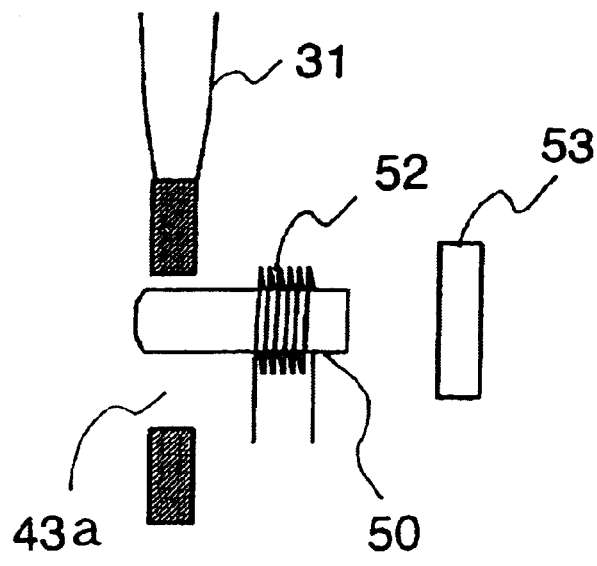

During the time period elapsing between the time point t25 and the time point t26, the correction lens 31 is gradually driven at a predetermined inclination, i.e., at the predetermined speed VCtarget1, along the detected gravitational direction. At the time point t26, the correction lens 31 reaches the point offset from the electromagnetic locking center position LRlock by the post-electromagnetic lock correction lens descending quantity ΔLRlock2. FIG. 11C shows the positional relationship between the correction lens 31 and the locking pin 50 at the time point t26. As shown in FIG. 11C, the gap between the locking pin 50 and the top of the locking hole 43a, i.e., the gap between the correction lens position LR and the electromagnetic locking play end at the time point t26 is smaller than the gap shown in FIG. 11B.

Figure 11D:
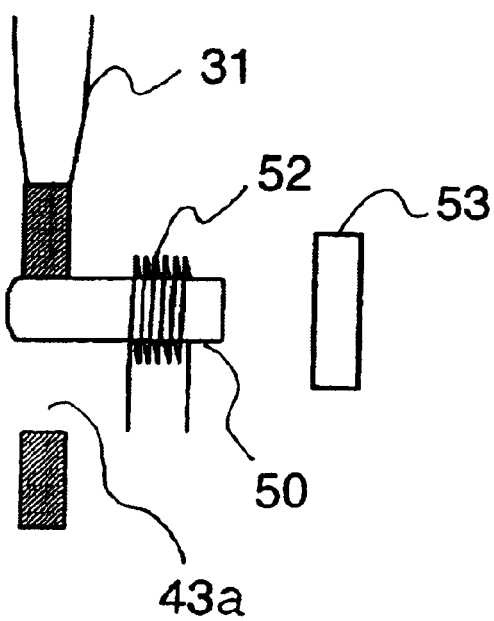

After the correction lens 31 is caused to move by the post-electromagnetic lock correction lens descending quantity ΔLRlock2, the power supply to the correction lens drive coils 40a and 40b ends and the drive control of the correction lens 31 ends at the time point t26. As a result, the correction lens 31 is allowed to move downward by a small extent along the gravitational direction and stops at the end of the electromagnetic locking play range, i.e., at the end of the correction lens movement range. FIG. 11D shows the positional relationship between the correction lens 31 and the locking pin 50 at a time point t27. As shown in FIG. 11D, the moving member 43 is in contact with the locking pin 50 inserted at the locking hole 43a at the time point t27.

As described above, after the electromagnetic lock is achieved, the correction lens 31 is made to gradually move along the gravitational direction by the predetermined quantity ΔLRlock2 in the second embodiment. As a result, the extent to which the correction lens 31 is allowed to become offset along the gravitational direction when the drive of the correction lens 31 ends can be greatly reduced. In addition, by driving the correction lens 31 at the low speed Vctarget1 during the time period elapsing between the time point t25 and the time point t26, the viewfinder image is prevented from becoming blurred to a disconcerting extent after the electromagnetic lock is achieved.

In addition, if the electromagnetic locking play range is inconsistent among individual products, the post-electromagnetic lock correction lens descending quantity ΔLRlock2 stored in the EEPROM 14 can be adjusted in a given product in conformance to the specific size and shape of the electromagnetic locking play range of the particular product.

As mentioned earlier, the speed VCtarget1 with which the correction lens 31 is made to move during the time period elapsing between the time point t25 and the time point t26 is stored in advance at the EEPROM 14. Thus, the speed with which the correction lens 31 is made to move after the electromagnetic lock is achieved can be adjusted with ease without having to modify the software mode at the MCU 1. For instance, the user may take the interchangeable lens 35 internally provided with the MCU 1 into a service center or the like to have the moving speed of the correction lens 31 adjusted to the user's liking.

Third Embodiment

The following is an explanation of the electromagnetic locking operation achieved in the third embodiment of the present invention. The third embodiment differs from the first embodiment in the method adopted to set the electromagnetic locking position LRlock' at which the correction lens 31 is electromagnetically locked. The following explanation focuses on the difference from the first embodiment.

Figure 12:
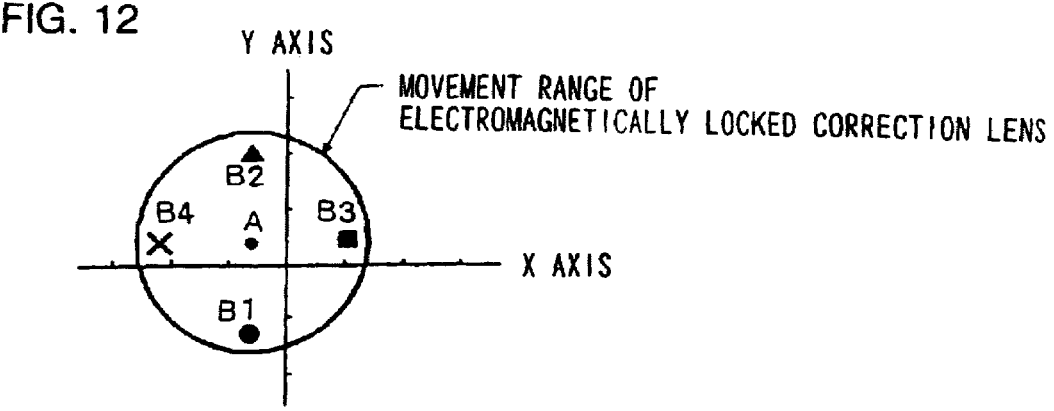
FIG. 12 schematically illustrates the relationship between the gravitational direction and the electromagnetic locking position within the correction lens movement range.

FIG. 12 shows the range over which the electromagnetically locked correction lens 31 is allowed to move over the X-Y plane, i.e. the range of the electromagnetic locking play. In FIG. 12, point A indicates the electromagnetic locking center position LRlock at the center of the electromagnetic locking play. Points B1~B4 indicate four electromagnetic locking positions LRlock' set within the electromagnetic locking play range. Namely, a plurality of electromagnetic locking positions LRlock' are set within the electromagnetic locking play range in the third embodiment. Then, an optimal electromagnetic locking position LRlock' is selected from a plurality of points in conformance to the detected gravitational direction.

In FIG. 12, point B1 indicates the electromagnetic locking position LRlock' selected when the detected gravitational direction is the −Y-axis direction, and point B2 indicates the electromagnetic locking position LRlock' selected when the detected gravitational direction is the +Y-axis direction. Point B3 indicates the electromagnetic locking position LRlock' selected when the detected gravitational direction is the +X-axis direction and point B4 indicates the electromagnetic locking position LRlock' selected when the detected gravitational direction is the −X-axis direction. These four points are each set at a position offset from the electromagnetic locking center position LRlock at point A by a predetermined extent, e.g., by an electromagnetic locking position correction quantity ΔLRlock1. And these four points are stored in advance into the EEPROM 14. The MCU 1 uses the stored electromagnetic locking positions LRlock' by reading them out whenever necessary.

When electromagnetically locking the correction lens 31, the MCU 1 detects the gravitational direction as in the first embodiment explained earlier. Then, a point among the preset four electromagnetic locking positions B1~B4, which is present along the direction closest to the detected gravitational direction, is selected as the electromagnetic locking position LRlock'. After setting the electromagnetic locking position LRlock', the MCU 1 controls the correction lens drive circuit 12 to drive the correction lens 31 to the electromagnetic locking position LRlock'. Subsequently, it controls the electromagnetic lock drive circuit 13 to supply power to the electromagnetic locking coil 52 and thus electromagnetically locks the correction lens 31. The drive control of the correction lens 31 and the electromagnetic locking operation executed in this embodiment are similar to those in the first embodiment shown in FIG. 8.

With a plurality of electromagnetic locking positions LRlock' set in advance in this manner, the arithmetic processing executed at the MCU 1 to set an electromagnetic locking position LRlock' in conformance to the detected gravitational direction can be simplified.

In addition, if the electromagnetic locking play range is inconsistent among individual products, the plurality of electromagnetic locking positions B1~B4 stored in the EEPROM 14 can be adjusted in a given product in conformance to the specific size and shape of the electromagnetic locking play range of the particular product.

It is to be noted that while four electromagnetic locking positions B1~B4 are set along the ±Y axis and ±X axis directions relative to the electromagnetic locking center position LRlock in the third embodiment, the present invention is not limited to this example. For instance, eight points may be set as electromagnetic locking positions LRlock', which include points present along diagonal directions (e.g., at ±45° angles and ±135° angles relative to the X axis) in reference to the electromagnetic locking center position LRlock together with the points along the ±Y axis and ±X axis. There is no restriction imposed with regard to the number of electromagnetic locking positions LRlock' that can be set in advance.

In the first through third embodiments explained above, the high-frequency component is eliminated from the correction lens drive quantities Vcontrol by calculating the correction lens average drive quantities Vcontrol_ave as the moving averages of the correction lens drive quantities Vcontrol or by executing LPF processing on the correction lens drive quantities Vcontrol to calculate the correction lens average drive quantities Vcontrol_ave. However, the present invention is not limited to this example, and the correction lens average drive quantities Vcontrol_ave may be calculated through another method. In addition, if the high-frequency component contained in the correction lens drive quantities Vcontrol is insignificant enough and thus does not affect the outcome of the gravitational direction detection, the detection of the gravitational direction may be executed by directly using the correction lens drive quantities Vcontrol without calculating the correction lens average drive quantities Vcontrol_ave.

The structure that may be adopted in the electromagnetic locking mechanism to lock the correction lens 31 after the blur correction operation is not limited to those adopted in the embodiments described above. In addition, the present invention may be adopted to mechanically lock the correction lens 31 instead of electromagnetically locking the correction lens 31. For instance, the present invention may be adopted in conjunction with a locking mechanism that mechanically locks and holds the correction lens 31 at the locking center position by interlocking with an operation of an operating lever by the user following the blur correction operation, as long as the locked correction lens 31 is allowed to move within the locking play range.

When such an alternative locking mechanism is utilized, too, the gravitational direction should be detected by using the correction lens drive quantities Vcontrol or the correction lens average drive quantities Vcontrol_ave calculated for the drive control of the correction lens 31. Then, after driving the correction lens 31 to a position offset from the locking center position at the center of the play range by the predetermined quantity ΔLRlock1 along the gravitational direction, the correction lens 31 should be locked. In this manner, the extent to which the locked correction lens 31 is allowed to become offset along the gravitational direction can be minimized. Alternatively, after locking the correction lens 31 at the locking center position, the correction lens 31 maybe made to gradually move along the detected gravitational direction.

While the shape of the electromagnetic locking play is round, as shown in FIGS. 6, 7 and 12 in the first through third embodiments described above, the present invention is not limited to this example. The shape of the locking play manifesting around the locked correction lens 31 varies among individual products. No restrictions are imposed with respect to the structure adopted in the locking mechanism or the shape of the locking play when implementing the present invention, as long as the extent of an image blur attributable to a displacement of the correction lens 31 having been locked by the locking device which locks the correction lens 31 following the blur correction operation can be reduced.

In addition, while an explanation is given above in reference to the first through third embodiments on the locking device that locks the correction lens 31 provided at the interchangeable lens 35 of a single lens reflex camera, the present invention is not limited to this example. For instance, the present invention may be also adopted in a compact camera, a video camera or binoculars having a locking mechanism with which a correction lens constituting a blur correction optical system is locked. Furthermore, the present invention may be adopted in both an electronic camera and a silver halide camera.

While an explanation is given above in reference to the first through third embodiments on an example in which the electric hardware shown in FIG. 1 is installed at the interchangeable lens 35, the present invention is not limited to this example. For instance, the hardware including the MCU 1 may be provided at the camera body 36 to be utilized to control the drive mechanism and the locking mechanism for the correction lens 31 provided at the interchangeable lens 35.

The above described embodiments are examples and various modifications can be made without departing from the spirit and scope of the invention.

What is claimed is:

1. A blur correction device comprising:
   a blur correction optical system that corrects an image blur caused by a vibration;
   a drive device that drives the blur correction optical system;
   a locking device that locks the blur correction optical system when an image blur correction is not executed;
   a gravitational direction detection device that detects a direction of a gravitational force applied to the blur correction optical system; and
   a control device that controls drive of the drive device and the locking device, wherein:
   after stopping an operation executed by the drive device to correct the image blur, the control device controls the drive device so as to reduce an extent to which the blur correction optical system having been locked by the locking device is allowed to move along the gravitational direction.

2. A blur correction device according to claim 1, wherein:
   the control device controls the drive device and the locking device so that the blur correction optical system is caused to move to a position away from a central position of a movement range of the blur correction optical system by a predetermined distance along the gravitational direction detected by the gravitational direction detection device and then the blur correction optical system is locked, the movement range being a range over which the blur correction optical system having been locked by the locking device is allowed to move due to play present between the blur correction optical system and the locking device.

3. A blur correction device according to claim 2, further comprising:
   a nonvolatile storage device that is rewritable, wherein:
   the predetermined distance is stored in the nonvolatile storage device; and
   the control device causes the blur correction optical system to move by the predetermined distance stored in the nonvolatile storage device.

4. A blur correction device according to claim 1, wherein:
   the control device controls the drive device and the locking device so that the blur correction optical system having been locked by the locking device is made to move to a substantial end of a movement range of the blur correction optical system along the gravitational direction detected by the gravitational direction detection device and then the blur correction optical system is locked, the movement range being a range over which the blur correction optical system is allowed to move due to play present between the blur correction optical system and the locking device.

5. A blur correction device according to claim 1, wherein:
   the control device selects one locking position among a plurality of locking positions set within a movement range of the blur correction optical system in conformance to the gravitational direction detected by the gravitational direction detection device and controls the drive device and the locking device so that the blur correction optical system is caused to move to the locking position having been selected and then the blur correction optical system is locked, the movement range being a range over which the blur correction optical system having been locked by the locking device is allowed to move due to play present between the blur correction optical system and the locking device.

6. A blur correction device according to claim 5, further comprising:
   a nonvolatile storage device that is rewritable, wherein:
   the plurality of locking positions are stored in memory at the nonvolatile storage device; and
   the control device selects one of the plurality of locking positions stored in memory at the nonvolatile storage device.

7. A blur correction device according to claim 1, wherein:
the control device controls the drive device so that after locking the blur correction optical system with the locking device, the blur correction optical system is made to move along the gravitational direction detected by an the gravitational direction detection device within a movement range over which the blur correction optical system having been locked by the locking device is allowed to move due to play present between the blur correction optical system and the locking device.

8. A blur correction device according to claim 7, wherein:
the control device controls the drive device so that after locking the blur correction optical system with the locking device, the blur correction optical system is caused to move away from a central position of the movement range by a predetermined extent along the gravitational direction.

9. A blur correction device according to claim 8, further comprising:
a nonvolatile storage device that is rewritable; wherein:
the predetermined extent is stored in the nonvolatile storage device; and
the control device causes the blur correction optical system to move by the predetermined extent stored in the nonvolatile storage device.

10. A blur correction device according to claim 7, wherein:
the control device causes the blur correction optical system to move along the gravitational direction at a predetermined speed after locking the blur correction optical system with the locking device.

11. A blur correction device according to claim 10, further comprising:
a nonvolatile storage device that is rewritable, wherein:
the predetermined speed is stored in the nonvolatile storage device; and
the control device causes the blur correction optical system to move at the predetermined speed stored in the nonvolatile storage device.

12. A blur correction device according to claim 1, wherein:
the gravitational direction detection device detects the gravitational direction based upon a drive quantity over which the blur correction optical system is driven by the drive device.

13. A blur correction device according to claim 12, wherein:
the drive device drives the blur correction optical system at least along two directions extending substantially perpendicular to each other; and
the gravitational direction detection device detects the gravitational direction based upon drive quantities over which the blur correction optical system is driven along the two directions by the drive device.

14. A blur correction device according to claim 1, wherein:
the gravitational direction detection device calculates a moving average of a drive quantity over which the blur correction optical system is driven by the drive device and detects the gravitational direction based upon the moving average having been calculated.

15. A blur correction device according to claim 1, wherein:
the gravitational direction detection device executes low pass filter processing on a drive quantity over which the blur correction optical system is driven by the drive device and detects the gravitational direction based upon low pass filter processing results.

16. A lens barrel comprising a blur correction device according to claim 1.

* * * * *